US012477262B2

(12) United States Patent
Lee

(10) Patent No.: US 12,477,262 B2
(45) Date of Patent: Nov. 18, 2025

(54) EARPHONE INCLUDING ROTATABLE EAR TIP

(71) Applicant: SAMSUNG ELECTRONICS CO., LTD., Suwon-si (KR)

(72) Inventor: Kyunghwan Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 250 days.

(21) Appl. No.: 18/102,426

(22) Filed: Jan. 27, 2023

(65) Prior Publication Data

US 2023/0247340 A1 Aug. 3, 2023

Related U.S. Application Data

(63) Continuation of application No. PCT/KR2023/001190, filed on Jan. 26, 2023.

(30) Foreign Application Priority Data

Jan. 28, 2022 (KR) ........................ 10-2022-0013565
Mar. 7, 2022 (KR) ........................ 10-2022-0028725

(51) Int. Cl.
*H04R 1/10* (2006.01)

(52) U.S. Cl.
CPC ........ *H04R 1/1016* (2013.01); *H04R 2460/11* (2013.01)

(58) Field of Classification Search
CPC .......................... H04R 1/1016; H04R 2460/11
See application file for complete search history.

(56) References Cited

U.S. PATENT DOCUMENTS 11,206,471 B1 * 12/2021 Seo ...................... H04R 1/1016
11,381,898 B2 7/2022 Choi et al.
(Continued)

FOREIGN PATENT DOCUMENTS

KR 10-2008-0095963 A 10/2008
KR 10-1363989 2/2014
(Continued)

OTHER PUBLICATIONS

Search Report dated May 17, 2023 in International Patent Application No. PCT/KR2023/001190.
(Continued)

*Primary Examiner* — Suhan Ni
(74) *Attorney, Agent, or Firm* — Nixon & Vanderhye, P.C.

(57) ABSTRACT

An example earphone includes a housing having a speaker module embedded therein and an ear tip connected to the housing. The housing includes a coupling portion having a sound hole formed in an end portion thereof. The ear tip includes a first tip including a first hollow aligned with the sound hole in a first direction and a first sidewall that surrounds the first hollow and a second tip including a second hollow in which the first tip is accommodated and a second sidewall that surrounds the second hollow, the first direction being a direction toward the speaker module from the sound hole. The first tip includes a first connecting portion having a protrusion form on an end portion thereof in the first direction. The coupling portion includes, on one surface thereof, a second connecting portion including a groove with which the first connecting portion is engaged. A connection gap is formed between facing surfaces of the first connecting portion and the second connecting portion, and the coupling portion of the housing and the ear tip are connected so as to be rotatable relative to each other.

13 Claims, 12 Drawing Sheets

(56) References Cited

U.S. PATENT DOCUMENTS

| | | | | |
|---|---|---|---|---|
| 2010/0322453 | A1* | 12/2010 | Matsuyama | H04R 1/2857 381/380 |
| 2011/0158457 | A1* | 6/2011 | Ishizaka | H04R 1/12 181/135 |
| 2017/0156932 | A1 | 6/2017 | Chae | |
| 2021/0258677 | A1 | 8/2021 | Choi et al. | |

FOREIGN PATENT DOCUMENTS

| | | |
|---|---|---|
| KR | 10-1484182 | 1/2015 |
| KR | 10-1485005 B1 | 1/2015 |
| KR | 10-2227132 | 3/2021 |

OTHER PUBLICATIONS

Written Opinion dated May 17, 2023 in International Patent Application No. PCT/KR2023/001190.

* cited by examiner

EARPHONE INCLUDING ROTATABLE EAR TIP

CROSS-REFERENCE TO RELATED APPLICATIONS

This application is a continuation of International Application No. PCT/KR2023/001190 designating the United States, filed on Jan. 26, 2023, in the Korean Intellectual Property Receiving Office and claiming priority to Korean Patent Application No. 10-2022-0013565, filed on Jan. 28, 2022, in the Korean Intellectual Property Office, and to Korean Patent Application No. 10-2022-0028725, filed on Mar. 7, 2022, in the Korean Intellectual Property Office, the disclosures of each of which are incorporated by reference herein in their entireties.

BACKGROUND

Field

The disclosure relates to an earphone including a rotatable ear tip.

Description of Related Art

An earphone in the related art, such as a kernel-type earphone, includes an ear tip insertable into a user's ear canal and a housing that has a speaker embedded therein and that is seated in a groove of a pinna connected with the ear canal. The ear tip in the related art is generally coupled to the housing in an overlapping manner to surround a coupling portion of the housing from the outside. The overlapping coupling is a method in which a coupling portion of the ear tip made of a flexible material is elastically deformed in conformance with the shape of the coupling portion of the housing and mounted on the coupling portion of the housing and the coupling is maintained using a friction force generated between contact surfaces of both the members. Accordingly, when the user rotates the housing to seat the housing in conformance with the groove of the pinna in a state in which the ear tip is inserted into the ear canal, the ear tip fixed to the housing is rotated together.

Furthermore, in general, the earphone in the related art has an air vent structure formed in the inner space of the housing. The air vent structure performs a function of replacing air in the inner space of the ear closed by the ear tip with air outside the ear tip in a worn state. Accordingly, the air vent structure is particularly provided in a kernel-type earphone to prevent a phenomenon in which the inner space of the ear is at high temperature and/or high humidity.

Moreover, the earphone in the related art generally has a coupling structure in which the coupling portion of the ear tip, which is a hook member, and the coupling portion of the housing in a recess form are engaged with each other. The recess of the housing is characterized in that the recess is formed deep in the thickness direction of the coupling portion such that the hook member is stably stopped by the recess.

SUMMARY

In general, when a user wears the earphone, the user frequently seats the earphone in conformance with the shape of the ear by holding and rotating the housing. In this case, according to the earphone in the related art, the ear tip fixedly coupled to the housing may rotate together with the housing, and therefore a surface of the ear tip may apply friction to the skin of the ear canal to cause skin irritation or a minor injury and, in a severe case, cause otitis externa.

Furthermore, the earphone in the related art has an air vent structure formed in an inner space of the housing. In this case, the volume and weight of the entire device may increase. Therefore, in order to enhance the compactness and light-weight characteristics of a wearable device such as an earphone, it is advantageous to form an air vent structure outside the housing (e.g., a connection portion between the housing and the ear tip) unlike in the related art.

The earphone in the related art is characterized in that a thickness of the coupling portion of the housing is increased by an amount by which the coupling portion of the ear tip overlaps the coupling portion of the housing. The coupling portion of the housing located inside the ear tip, when inserted into the user's ear canal, may be brought into close contact with the user's ear canal due to the increased thickness to unnecessarily press the inner wall of the ear.

Moreover, when the recess is formed deep on the periphery of the coupling portion of the housing as in the earphone in the related art, the width of a sound passage formed in the coupling portion is limited as much as the depth of the recess. When the width of the sound passage is decreased, a resonance space of sound waves transferred to the sound passage may be reduced, and therefore the sound quality performance of the earphone may be deteriorated.

Various example embodiments of the disclosure provide an earphone that includes an ear tip and a housing coupled with each other so as to be rotatable relative to each other and an external air vent structure formed by a space between a facing surface of the ear tip and a facing surface of the housing.

An earphone according to an example embodiment of the disclosure includes a housing having a speaker module embedded therein and an ear tip connected to the housing. The housing includes a coupling portion having a sound hole formed in an end portion thereof. The ear tip includes a first tip including a first hollow aligned with the sound hole in a first direction and a first sidewall that surrounds the first hollow and a second tip including a second hollow in which the first tip is accommodated and a second sidewall that surrounds the second hollow, the first direction being a direction toward the speaker module from the sound hole. The first tip includes a first connecting portion having a protrusion on an end portion thereof in the first direction. The coupling portion includes, on one surface thereof, a second connecting portion having a groove with which the first connecting portion is engaged. A connection gap is formed between facing surfaces of the first connecting portion and the second connecting portion, and the coupling portion of the housing and the ear tip are connected so as to be rotatable relative to each other.

An earphone according to an example embodiment of the disclosure includes a housing including a coupling portion having a sound hole formed in an end portion thereof and an ear tip connected to the coupling portion so as to be rotatable. The ear tip includes a hollow fluidically connected with the sound hole in a first direction, a sidewall that surrounds the hollow, and a first connecting portion that has a protrusion and that is formed on an end portion of the sidewall in the first direction, the first direction being a direction in which the coupling portion extends. The coupling portion includes, on one surface thereof, a second connecting portion having a groove with which the first connecting portion is engaged. A connection gap is formed between facing surfaces of the first connecting portion and the second connecting portion coupled with each other, and the first connecting portion is configured to slide along the second connecting portion.

An earphone according to various example embodiments of the disclosure may include an ear tip and a housing connected so as to be rotatable relative to each other. Accordingly, the ear tip may be seated in an ear canal irrespective of rotation of the housing and thus may be prevented from unnecessarily rotating to irritate the skin of the ear canal in a wearing process.

Furthermore, an earphone according to various example embodiments of the disclosure may include an external air vent structure formed by the space between a facing surface of an ear tip and a facing surface of a housing. Thus, the ear phone may be made more compact and lighter than an earphone in the related art that has an internal air vent structure and may discharge heat and moisture in an ear to the outside through the external air vent structure, thereby eliminating causes of otitis externa (e.g. skin irritation, heat, moisture).

Moreover, according to various example embodiments of the disclosure, an unnecessary increase in the thickness of the coupling portion of the housing may be prevented or reduced by connecting the ear tip and the housing without an overlapping area, and the width of the sound passage located in the coupling portion may be sufficiently secured by forming the recess of the coupling portion of the housing to a smaller depth than in the related art.

In addition, the disclosure may provide various effects that are directly or indirectly recognized.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of the drawings, identical or similar reference numerals may be used to refer to identical or similar components.

DETAILED DESCRIPTION

Figure 1:
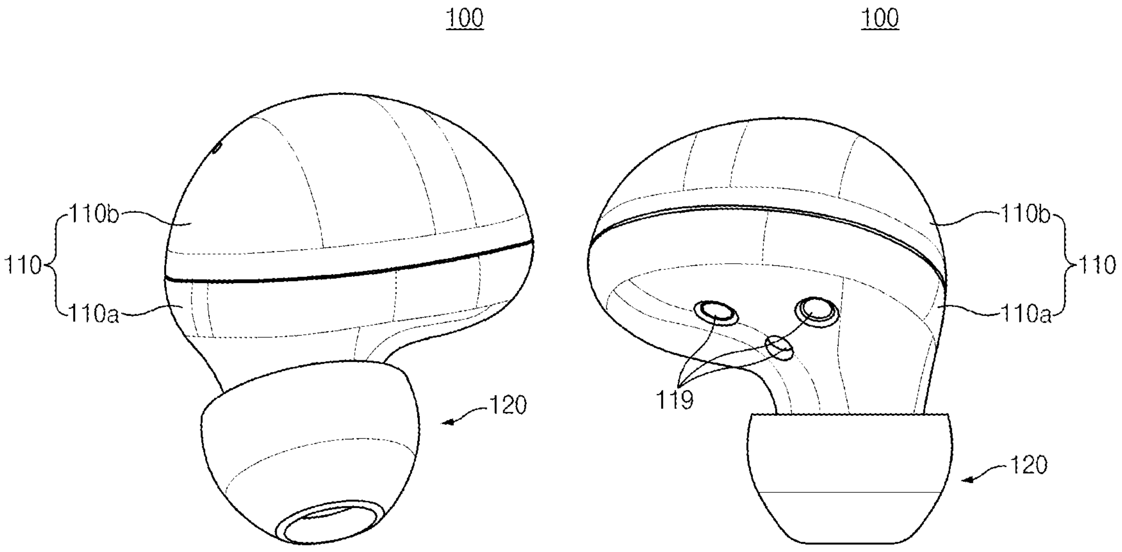
FIG. 1 is a perspective view of an example earphone according to various embodiments.

Hereinafter, various example embodiments of the disclosure may be described with reference to accompanying drawings. Accordingly, those of ordinary skill in the art will recognize that modifications, equivalents, and/or alternatives on the various example embodiments described herein can be variously made without departing from the scope and spirit of the disclosure.

The term "first direction" used herein refers, for example, to a direction in which sound passages extend from a coupling portion of a housing toward a speaker module via sound holes and is indicated by an arrow A in the drawings. The term "second direction" used herein refers, for example, to a direction opposite to the first direction and is indicated by an arrow B in the drawings. The term "lateral direction" used herein refers, for example, to a direction perpendicular to the first direction and/or the second direction. The "outward direction" of a member refers, for example, to a direction extending outward on the same plane from a center of a lateral cross-section of the member, and the "inward direction" of the member refers, for example, to a direction opposite to the outward direction. When the lateral cross-section of the member has a circular shape, the outward direction may refer, for example, to a direction extending outward on the same plane from the center of the circle, and the inward direction may, for example, refer to a direction opposite to the outward direction. The coupling portion of the housing, a first hollow of a first tip, and a second hollow of a second tip according to various embodiments of the disclosure are illustrated in a cylindrical shape having a circular lateral cross-section. However, the aforementioned components may be formed in different shapes. "An end portion of the second tip in the first direction" refers, for example, to an end portion in the first direction that is adjacent to a second sidewall of the second tip. The following descriptions of various example embodiments of the disclosure will be focused on examples applied to wireless earphones. However, coupling structures between housings and ear tips and external air vent structures of the above embodiments may all be applied to various devices such as wired earphones and headphones in which ear tips are mounted.

Figure 2:
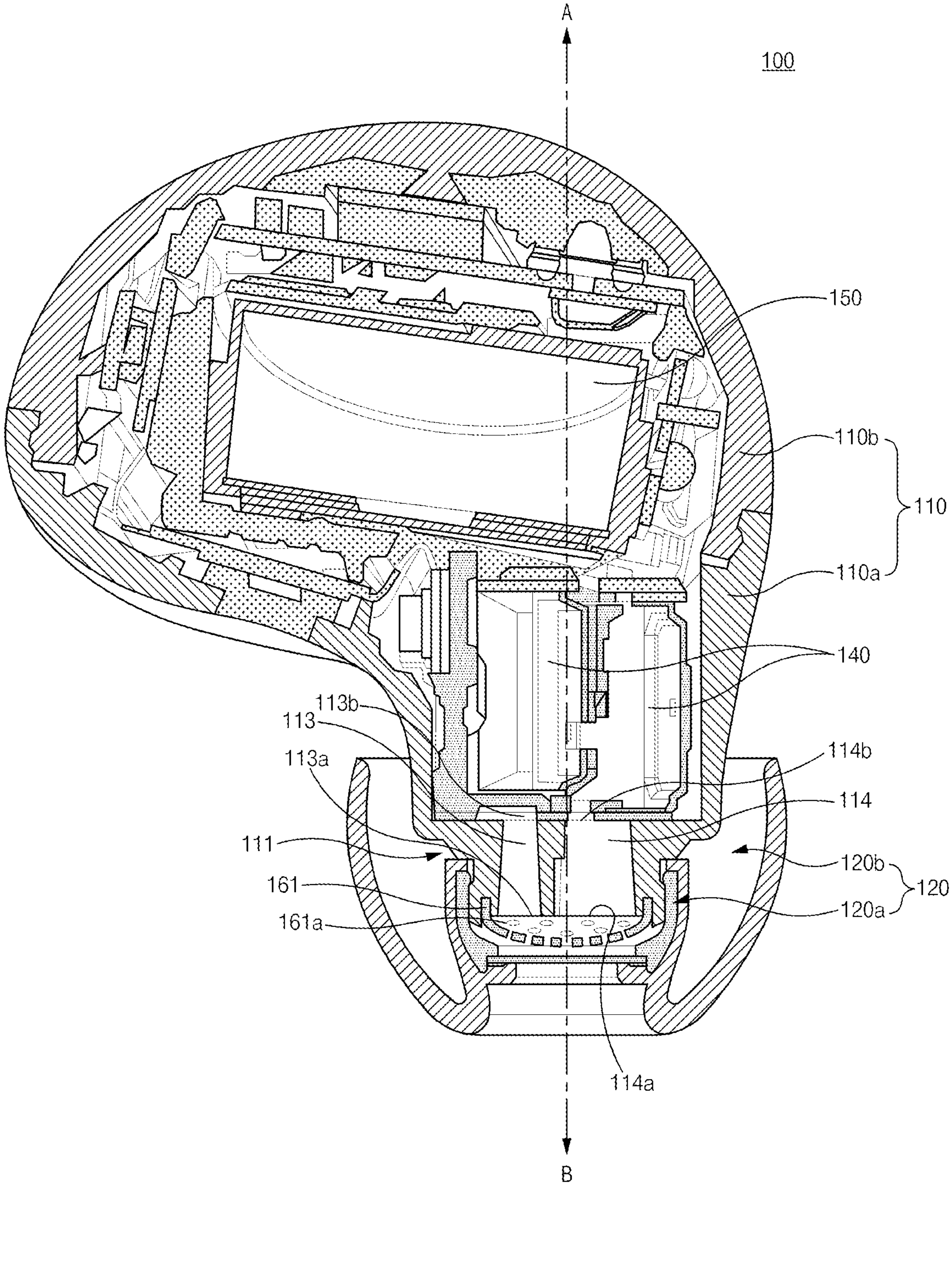
FIG. 2 is a sectional view of an example earphone according to various embodiments.

FIG. 1 is a perspective view of an example earphone 100 according to various embodiments. FIG. 2 is a sectional view of an example earphone 100 according to various embodiments.

Referring to FIGS. 1 and 2, the earphone 100 according to an embodiment may include a housing 110 and an ear tip 120. The housing 110 may include a first part 110*a* having a coupling portion 111 and a second part 110*b* coupled with the first part 110*a* to form an exterior. The housing 110 may include a speaker module 140 and a battery module 150 in an inner space formed by the first part 110*a* and the second part 110*b*. The coupling portion 111 may include first and second sound passages 113 and 114 formed therein and first and second sound holes 113*a* and 114*a* that the first and second sound passages 113 and 114 extend to an end of the coupling portion 111. A speaker grill 161 may be coupled to the end of the coupling portion 111 to cover the first and second sound holes 113*a* and 114*a*. The ear tip 120 may include a first tip 120*a* and a second tip 120*b*.

The earphone 100 according to an embodiment may be worn in a user's ear in such a way that all or part of the ear tip 120 is inserted into the user's ear canal. The coupling portion 111 of the first part 110*a* of the housing 110 may be connected with the ear tip 120 and inserted into the ear canal together with the ear tip 120, and the second part 110*b* may be worn on the pinna connected to the ear canal. The first part 110*a* and the second part 110*b* of the housing 110 may be coupled with each other to form the exterior of the earphone 100. The first part 110*a* and the second part 110*b* may be formed such that ends making contact with each other in the coupled state form one continuous surface.

The first part 110*a* and the second part 110*b* may be fastened to each other in a snap-fit manner while partial regions thereof overlap each other. For example, a fastening member to be coupled with the second part 110*b* may be formed on at least a partial region of an outer edge of one open end portion of the first part 110*a*. A fastening recess to be engaged with the fastening member may be formed on an open end portion of the second part 110*b*. In contrast, a fastening recess may be formed on the first part 110*a*, and a fastening member may be formed on the second part 110*b*. In an embodiment, the first part 110*a* and the second part 110*b* may be integrally formed with each other.

Referring to FIG. 1, a plurality of charging terminals 119 may be formed in the first part 110*a*.

The coupling portion 111 of the first part 110*a* may have the ear tip 120 mounted on an end portion thereof and may have the sound passages 113 and 114 formed therein. The first part 110*a* of the housing 110 may be connected with the second part 110*b* at an end thereof in the first direction and may have a shape in which the width is decreased toward the coupling portion 111 from the end facing the first direction. For example, the coupling portion 111 may have the shape of a circular tube member extending in the second direction B.

The coupling portion 111 may include the first and second sound passages 113 and 114 formed therethrough in the first direction A (or, the second direction B). For example, at least partial regions of the first and second sound passages 113 and 114 may be aligned with each other in a lengthwise direction. For example, the first and second sound passages 113 and 114 may be cylindrical hollows having a gradually increasing or decreasing width in the second direction B. The first sound passage 113 may extend between a first inner end portion 113*b* and the first sound hole 113*a*, and the second sound passage 114 may extend between a second inner end portion 114*b* and the second sound hole 114*a*. The first and second inner end portions 113*b* and 114*b* may be open holes through which sound waves output from the speaker module 140 are transferred to the first and second sound passages 113 and 114. The sound waves may be transferred to the user's ear drum through the first and second sound holes 113*a* and 114*a* and the ear tip 120. In an embodiment, the numbers of sound passages and sound holes of the coupling portion 111 may be set to be different from those in this example embodiment.

The speaker grill 161 may be coupled to the end of the coupling portion 111 to cover the first and second sound holes 113*a* and 114*a*. The coupling portion 111 may have, on a surface thereof in the second direction, a fixing groove into which the periphery of the speaker grill 161 is inserted. The speaker grill 161 may be spaced apart from the first and second sound holes 113*a* and 114*a* and may form a resonance space connected with the first and second sound passages 113 and 114 between the speaker grill 161 and the first and second sound holes 113*a* and 114*a*. In an embodiment, the speaker grill 161 may include a curved surface, and the curved surface may have a shape rising in the second direction B toward a central portion. The speaker grill 161 may have a plurality of open holes 161*a* formed therein through which the sound waves emitted through the first and second sound holes 113*a* and 114*a* are transferred to the outside of the housing 110. For example, the speaker holes 161*a* of the speaker grill 161 may have various shapes, such as a circular shape, an oval shape, and the like, and the speaker grill 161 may be a mesh member having openings formed therein in a fine pattern form.

Figure 3:
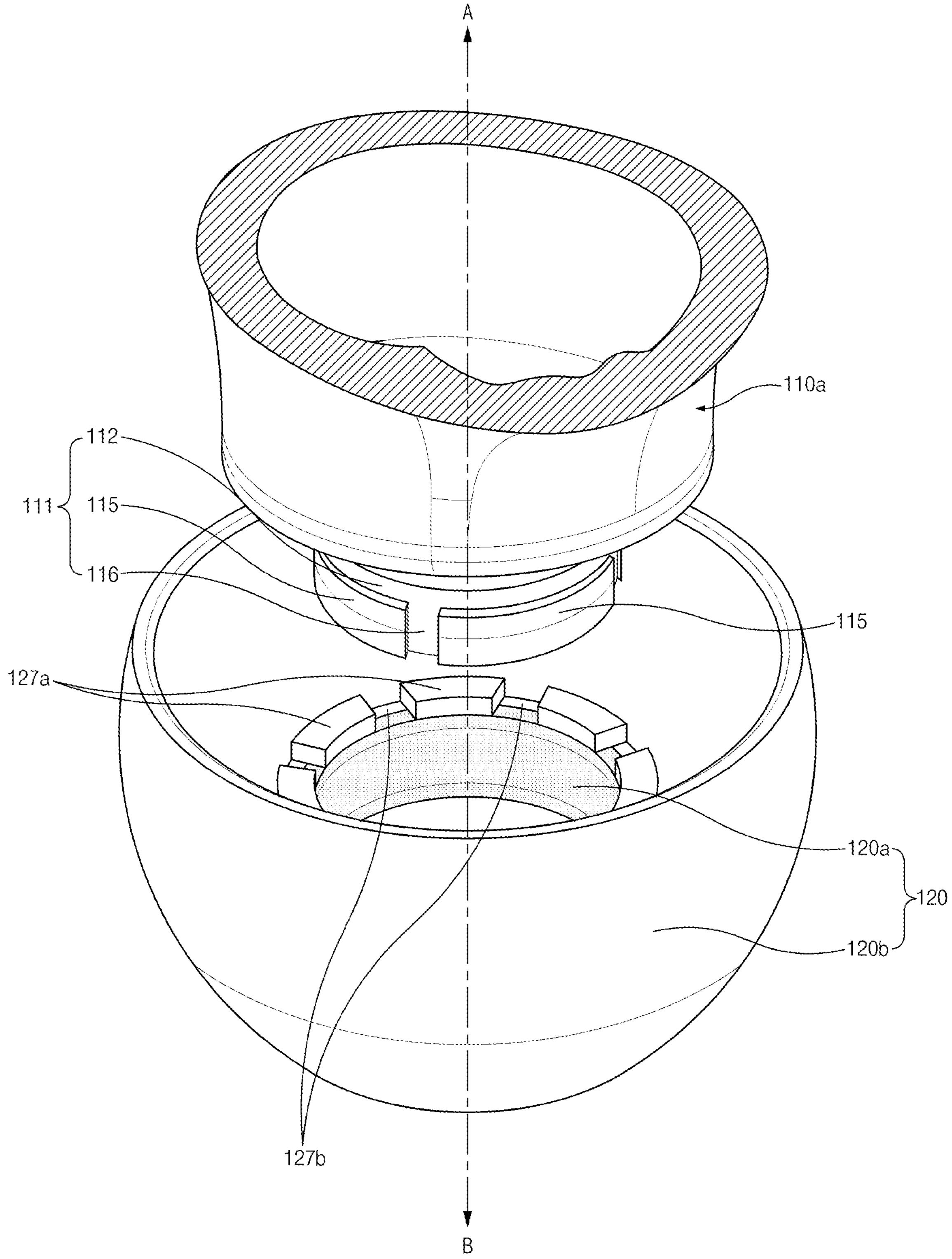
FIG. 3 is a perspective view illustrating a first part of a housing and an ear tip of an example earphone according to various embodiments.
Figure 4:
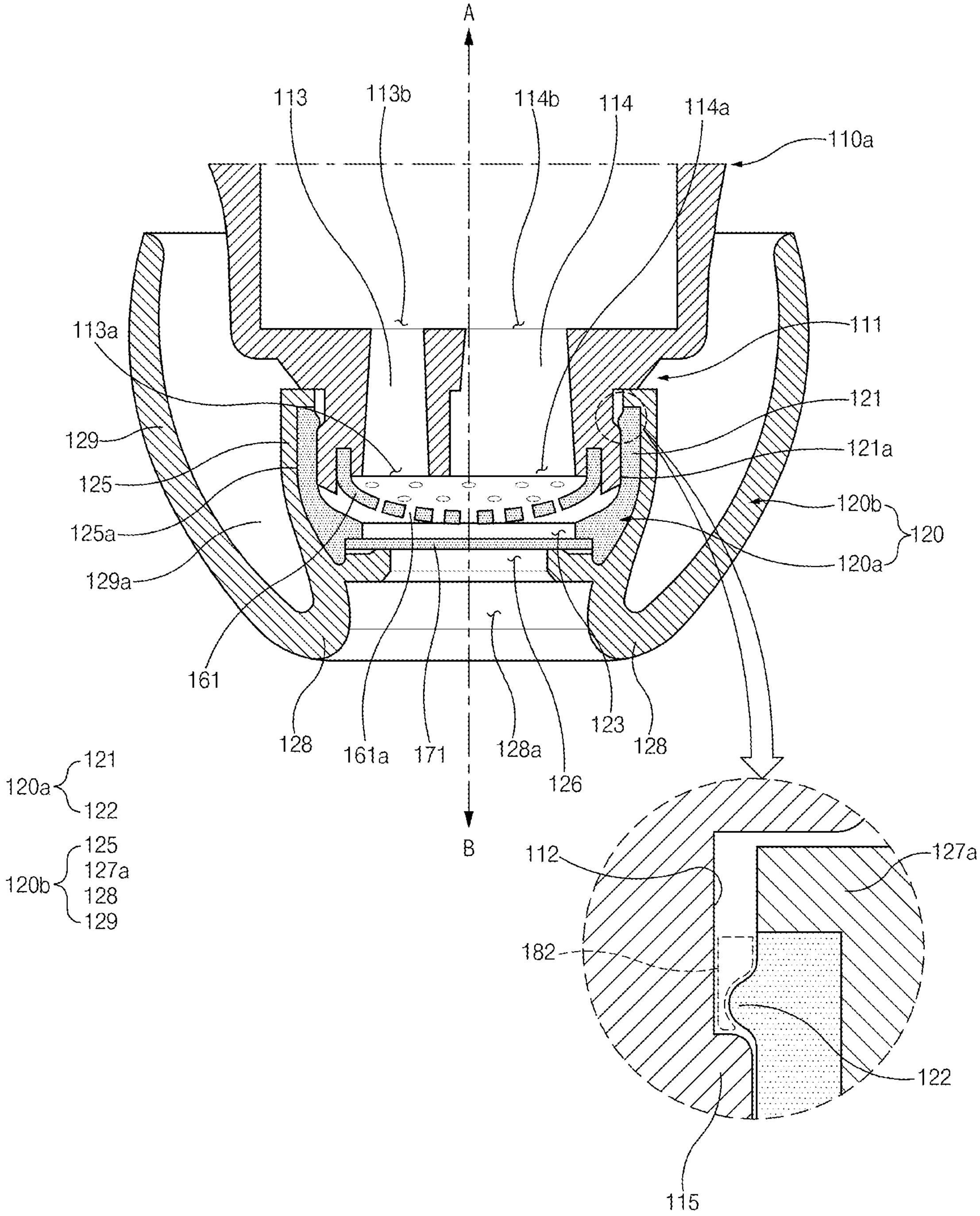
FIG. 4 illustrates a sectional view and a partial enlarged view of a coupling portion of the housing and the ear tip of an example earphone according to various embodiments.

FIG. 3 is a perspective view illustrating the first part 110*a* of the housing 110 and the ear tip 120 of an example earphone 100 according to various embodiments. FIG. 4 illustrates a sectional view and a partial enlarged view of the coupling portion 111 of the housing 110 and the ear tip 120 of an example earphone 100 according to various embodiments.

Referring to FIGS. 3 and 4, the ear tip 120 of the earphone 100 according to an embodiment may include the first tip 120*a* coupled with the coupling portion 111 and the second tip 120*b* coupled to the outside of the first tip 120*a*. The first tip 120*a* may include a first hollow 121*a* and a first sidewall 121. The second tip 120*b* may include a second hollow 125*a* and a second sidewall 125. A foreign matter blocking part 171 (e.g., shield) may be provided between the first tip 120*a* and the second tip 120*b*. The first tip 120*a* may include a first connecting portion 122 on an end portion thereof in the first direction, and the coupling portion 111 may include a second coupling portion 112 to which the first connecting portion 122 is coupled.

The first tip 120*a* may include the first hollow 121*a* formed to penetrate in the first direction A and the first sidewall 121 surrounding the first hollow 121*a*. In a state in which the first tip 120*a* is coupled to the coupling portion 111, the first hollow 121*a* may be connected with the first and second sound passages 113 and 114 through the first and second sound holes 113*a* and 114*a*. An outer surface of the first sidewall 121 and/or the first hollow 121*a* may have a cylindrical shape and may have a tapered shape having a decreasing width in the first direction A. The first tip 120*a* may have, in an end portion thereof in the second direction, a first hole 123 connected with the first hollow 121*a*. The first hole 123 may have a smaller diameter than an opening in the end portion of the first tip 120*a* in the first direction.

The second tip 120*b* may include the second hollow 125*a* formed to penetrate in the first direction A and the second sidewall 125 surrounding the second hollow 125*a*. An outer surface of the second sidewall 125 and/or the second hollow 125*a* may have a cylindrical shape and may have a tapered shape having a decreasing width in the first direction A. The second tip 120*b* may have, in an end portion thereof in the second direction, a second hole 126 connected with the second hollow 125*a*. The second hole 126 may have a smaller diameter than an opening in an end portion of the second tip 120*b* in the first direction.

The second hollow 125*a* may be formed to have a larger diameter than the perimeter (or, the outer circumference) of the first tip 120*a*, and the first tip 120*a* may be coupled with the second tip 120*b* in a form accommodated in the second hollow 125*a*. For example, the first tip 120*a* may be coupled such that the entire outer surface of the first sidewall 121 makes contact with an inner surface of the second sidewall 125. The first hollow 121*a* and the second hollow 125*a* may be aligned in the first direction A. The first tip 120*a* and the second tip 120*b* may be integrally formed through double injection molding.

The second tip 120*b* may include a step portion 128 protruding in the second direction B from a region adjacent to an end portion of the second hole 126 in the second direction. The second tip 120*b* may include an external hole 128*a* connected with the second hole 126, and the external hole 128*a* may be surrounded by the step portion 128. The second tip 120*b* may include an outside wall portion 129 extending from the step portion 128 in the first direction A. The outside wall portion 129 may be spaced apart from the outer surface of the second sidewall 125 of the second tip 120 to form a variable space 129*a* therebetween. The second tip 120*b* may include a flexible material, and when inserted into the user's ear canal, the outside wall portion 129 may be elastically deformed in conformance with the shape of the ear canal.

The first tip 120*a* may be formed of a material different from that of the second tip 120*b*. The first tip 120*a* may be formed of a flexible material having a higher hardness than the second tip 120*b* so as to be firmly coupled to the coupling portion 111. The first tip 120*a* may include a flexible material that is capable of elastic deformation, but has a low coefficient of friction.

To implement a structure in which the first tip 120*a* rotates relative to the housing 110 (or, the housing 110 rotates relative to the first tip 120*a*), a friction force between adjacent surfaces or contact surfaces of the first tip 120*a* and the coupling portion 111 may be reduced or minimized. Since the first tip 120*a* made of a flexible material has a lower hardness than the coupling portion 111, the first tip 120*a* may be more vulnerable to damage due to friction than the coupling portion 111. Accordingly, the first tip 120*a* may preferably be formed of a flexible material that is capable of elastic deformation, but has a low coefficient of friction and high wear resistance. For example, the first tip 120*a* may include polyacetal (POM), polycarbonate (PC), acrylonitrile-butadiene-styrene (ABS) resin, or a combination thereof. Among the aforementioned materials, the polyacetal (POM) is appropriate for forming the first tip 120*a* in that the polyacetal (POM), which is a self-lubricative material, has lower frictional resistance than the other materials. The material of the first tip 120*a* is not limited to the above examples. The first tip 120*a* may be formed of various materials that allow the first sidewall 121 of the first tip 120*a* to rotate in a circumferential direction along an outer surface of the coupling portion 111 in a state of partially making contact with the coupling portion 111.

The foreign matter blocking part 171 (or shield) may be provided between the first hole 123 and the second hole 126. For example, the foreign matter blocking part 171 may be a thin film member that transmits air, but prevents or reduces infiltration of foreign matter into the sound passages from the outside. The foreign matter blocking part 171 may have a plurality of through-holes formed therein through which sound waves are transferred. For example, the foreign matter blocking part 171 may be a mesh member having openings formed therein in a fine pattern form.

Referring to FIGS. 3 and 4, the first tip 120*a* of the ear tip 120 according to an embodiment may include the first connecting portion 122 that a partial region of the end portion of the first tip 120*a* in the first direction protrudes inward to form. The coupling portion 111 may include the second connecting portion 112 having a groove formed thereon in which at least part of the first connecting portion 122 is accommodated. The coupling portion 111 may have one or more steps 115 formed on an outer surface thereof. A groove 116 extending from an outer edge of the end portion of the coupling portion 111 to the second connecting portion 112 may be formed between the steps 115 adjacent to each other. For example, the groove 116 may extend in a direction parallel to the first direction A and/or the second direction B. The second tip 120*b* may have, on the end portion thereof in the first direction, a plurality of cover portions 127*a* that cover a surface of the first tip 120*a* that faces the first direction. A first recess 127*b* may be formed between the cover portions 127*a* adjacent to each other. A connection gap 182 may exist between facing surfaces of the first connecting portion 122 and the second connecting portion 112.

In an embodiment, the first connecting portion 122 of the first tip 120*a* may be a protrusion formed on the end portion of the first tip 120*a* in the first direction or a region adjacent thereto. In an embodiment, the first connecting portion 122 may have a protrusion form that is formed on an inner surface of the first tip 120*a* (or, the first sidewall 121) and that protrudes inward so as to be stopped by the second connecting portion 112. For example, the inner surface of the first sidewall 121 may be a surface that faces the coupling portion 111, and the first connecting portion 122 may protrude from the inner surface toward the coupling portion 111 (or, the second connecting portion 112). The second connecting portion 112 may have a groove form that is formed along the perimeter (or, the outer circumference) of the outer surface of the coupling portion 111 and in which at least part of the first connecting portion 122 is accommodated. For example, the second connecting portion 112 may have a groove form that extends along the entire outer circumference of the coupling portion 111 to form a ring, or may have a groove form extending along only a portion of the outer circumference of the coupling portion 111. For example, the second connecting portion 112 may have a groove form formed parallel to the edge of the end portion of the coupling portion 111.

The first connecting portion 122 may slide along the outer circumference of the coupling portion 111 in the state of being accommodated in the second connecting portion 112. When the housing 110 is rotated while the earphone 100 is worn in the user's ear, the ear tip 120 may remain inserted into the ear canal without rotating together. According to this configuration, the ear tip 120 may be prevented from being unintentionally rotated (or unintended rotation of the ear tip 120 may be reduced) to irritate the skin of the ear canal even when the housing 110 is rotated in a process of wearing the earphone 100.

As illustrated in FIG. 4, the first connecting portion 122 may have a curved protrusion shape. Corners of the second connecting portion 112 in contact with the first connecting portion 122 may be chamfered and curved. The first connecting portion 122 and the second connecting portion 112 illustrated in the drawings are merely examples, and the shapes of the first connecting portion 122 and the second connecting portion 112 are not limited thereto.

The second connecting portion 112 may be formed on a region spaced apart from the outer edge of the end portion of the coupling portion 111 in the first direction A. Accordingly, the steps 115 protruding outward may be formed between the second connecting portion 112 and the end portion of the coupling portion 111.

Surfaces of the steps 115 in the first direction may be surfaces by which the first connecting portion 122 is stopped and supported and, for example, may be surfaces that abut the outer surface of the coupling portion 111 and are perpendicular to the outer surface of the coupling portion 111. The second connecting portion 112 may be formed by the surfaces of the steps 115 in the first direction and the outer surface of the coupling portion 111 abutting the surfaces of the steps 115 in the first direction A. The first connecting portion 122 may be coupled to the second connecting portion 112 in a form in which the shape of the protrusion is stopped by the surfaces of the steps 115 that face the first direction.

The ear tip 120 may be coupled to the first part 110*a* of the housing 110 in a snap-fit manner. That is, when the ear tip 120 is mounted on the housing 110, the first connecting portion 122 of the first tip 120*a* may be elastically deformed and mounted on the end portion of the coupling portion 111 to surround the end portion of the coupling portion 111 and may be moved toward the second connecting portion 112 such that the shape of the protrusion of the first connecting portion 122 is seated in the shape of the groove of the second connecting portion 112.

The coupling portion 111 may include, on the outer surface thereof, the groove 116 extending from the outer edge of the end portion of the coupling portion 111 to the second connecting portion 112. For example, the groove 116 may be formed such that no step exists in a region connected with the second connecting portion 112. For example, the groove 116 may be formed to a depth the same as that of the groove of the second connecting portion 112. In an embodiment, a plurality of grooves 116 may be formed.

In an embodiment, the grooves 116 may be formed on the outer surface of the coupling portion 111 and/or the inner surface of the first tip 120*a* (or, the inner surface of the sidewall 121) and may space the outer surface of the coupling portion 111 apart from the inner surface of the first tip 120*a* by a predetermined gap. In this case, the grooves 116 may be formed on regions of the inner surface of the first tip 120*a* that face the outer surface of the coupling portion 111 and may extend in the first direction A and/or the second direction B.

The grooves 116 may allow the outer surface of the coupling portion 111 and the inner surface of the first tip 120*a* (or, the inner surface of the sidewall 121) to be spaced apart from each other by the predetermined gap, and thus the first hollow 121*a* of the first tip 120*a* and the connection gap 182 between the first connecting portion 122 and the second connecting portion 112 may be fluidically connected with each other.

The second tip 120*b* may have, on the end portion thereof in the first direction, the cover portions 127*a* extending inward to cover the surface of the first tip 120*a* that faces the first direction. For example, the cover portions 127*a* may have a form extending inward toward an inner edge of the end portion of the first tip 120*a* in the first direction from the end portion of the second tip 120*b* in the first direction. In an embodiment, the cover portions 127*a* may be formed to the inner edge of the end portion of the first tip 120*a* that faces the first direction. The cover portions 127*a* may serve to protect the first tip 120*a* from friction when the housing 110 rotates. In a case in which the first tip 120*a* and the second tip 120*b* are separately formed and then coupled, the cover portions 127*a* may serve to maintain the coupling between the two tips.

A plurality of cover portions 127*a* may be formed. The first recess 127*b* may be formed between the cover portions 127*a* adjacent to each other. The first recess 127*b* may connect the end portion of the first tip 120*a* in the first direction and the outside of the ear tip 120. For example, as illustrated in FIG. 3, a plurality of first recesses 127*b* may be formed with a predetermined gap therebetween. Referring to FIG. 3, for example, in the lateral direction, the first recesses 127*b* may form the same plane as the surface of the first tip 120*a* that faces the first direction.

As the housing 110 is rotated relative to the ear tip 120, an alignment state of the first recesses 127*b* and the grooves 116 of the coupling portion 111 may be changed. Accordingly, in the earphone 100 in an arbitrary state, all of the first recesses 127*b* may not be aligned with the grooves 116 of the coupling portion 111 in the lateral direction, and at least one first recess 127*b* may be aligned with the groove 116 in the lateral direction.

In an embodiment, the second tip 120*b* may not include the cover portions 127*a*, and in the lateral direction, the entire surface of the second tip 120*b* in the first direction may form the same plane as the surface of the first tip 120*a* in the first direction.

The cover portions 127*a* may be inserted into the second connecting portion 112 together with the first connecting portion 122, or may be disposed adjacent to the second connecting portion 112. Referring to the partial enlarged view of FIG. 4, the cover portions 127*a* may be spaced apart from a surface of the coupling portion 111 that faces the cover portions 127*a* (e.g., the surface of the second connecting portion 112 and a surface abutting the surface and facing the first direction). Accordingly, when the housing 110 is rotated relative to the ear tip 120, friction due to contact between the cover portions 127*a* and the coupling portion 111 may not occur.

Referring to the partial enlarged view of FIG. 4, the connection gap 182 may be formed between the facing surfaces of the first connecting portion 122 and the second connecting portion 112. Since the connection gap 182 exists, friction between the first connecting portion 122 and the second connecting portion 112 may be minimized when the housing 100 rotates relative to the first tip 120*a*. As illustrated in FIG. 4, the steps 115 of the coupling portion 111 and the first tip 120*a* may be disposed such that facing surfaces do not make contact with each other. For example, in a case in which the first tip 120*a* is formed of polyacetal (POM), the steps 115 of the coupling portion 111 and the inner surface of the first tip 120*a* may make contact with each other.

Hereinafter, an external air vent (V1) structure of the earphone 100 according to an embodiment will be described.

Figure 5:
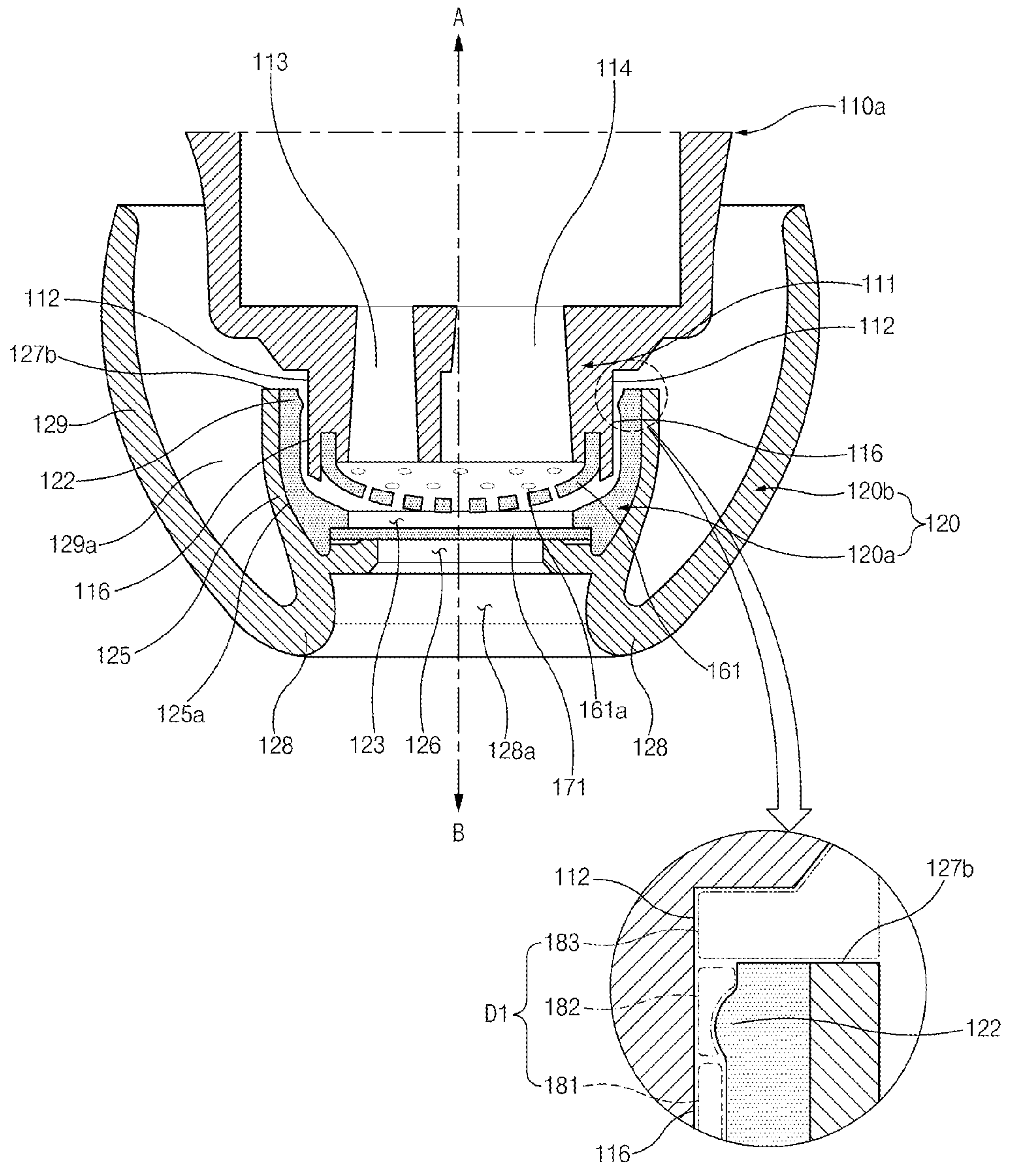
FIG. 5 illustrates a sectional view and a partial enlarged view of the coupling portion of the housing and the ear tip of an example earphone according to various embodiments.
Figure 6:
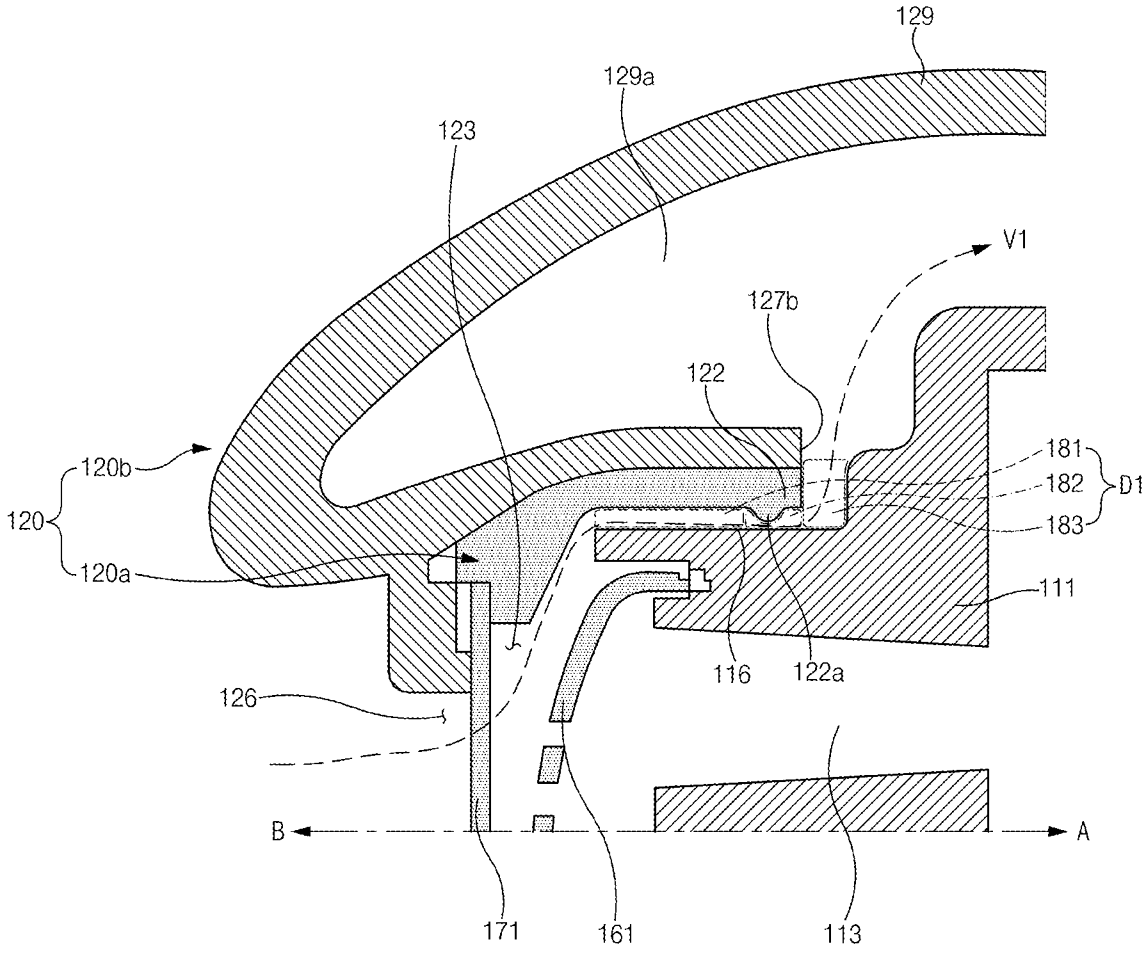
FIG. 6 is a schematic view illustrating an external air vent structure of an example earphone according to various embodiments.

FIG. 5 illustrates a sectional view and a partial enlarged view of the coupling portion 111 of the housing 110 and the ear tip 120 of an example earphone 100 according to various embodiments. FIG. 6 is a schematic view illustrating the external air vent (V1) structure of an example earphone 100 according to various embodiments. FIG. 5 is a sectional view illustrating a state in which the grooves 116 of the coupling portion 111 and the first recesses 127*b* of the second tip 120*b* are aligned with each other in the lateral direction.

As illustrated in FIG. 5, the grooves 116 may be spaced apart from the inner surface of the first tip 120*a* to form a first gap 181 therebetween. The first gap 181 may be connected with the connection gap 182 between the facing surfaces of the first connecting portion 122 and the second connecting portion 112 in the first direction A and may be connected with the first hollow 121*a* of the first tip 120*a* in the second direction B.

A second gap 183 may be formed between the first recesses 127*b* and the facing surface of the coupling portion

111. The second gap 183 may be connected with the connection gap 182 in the second direction B and may be open in the lateral direction and connected with the variable space 129*a*. The second gap 183, the connection gap 182, the first gap 181, and the first hollow 121*a* may be connected (or, fluidically connected) with each other such that fluid such as air is able to pass therethrough.

Referring to FIG. 6, a first space D1 may be formed between the ear tip 120 and the facing surface of the coupling portion 111. The first space D1 may be formed by the first gap 181 between the grooves 116 and the first tip 120*a*, the connection gap 182 between the first connecting portion 122 and the second connecting portion 182, and the third gap 183 between the first recesses 127*b* and the coupling portion 111. The first space D1 may form the external air vent (V1) structure through which fluid such as air is able to flow between the coupling portion 111 and the first tip 120*a*.

The plurality of grooves 116 and the plurality of first recesses 127*b* may be formed, and at least one groove 116 may be aligned with the first recess 127*b* in the lateral direction depending on a state in which the housing 110 is rotated relative to the ear tip 120. Since the connection gap 182 is continuously formed on the outer surface of the coupling portion 111 along the outer circumference, even though the grooves 116 and the first recesses 127*b* are not aligned with each other, the first gap 181 between the grooves 116 and the first tip 120*a* may be connected with the second gap 183 between the first recesses 127*b* and the coupling portion 111 through the connection gap 182 as one space to form the first space D1.

Referring to FIG. 6, in an embodiment, the external air vent V1 may be formed by a path from the second hole 126 of the second tip 120*b* to the variable space 129*a* of the second tip 120*b* via the third hole 123 (or, the first hollow 121*a*) of the first tip 120*a* and the first space D1. For example, air may be introduced into the second hole 126 of the second tip 120*b* and may be discharged outside the earphone 100 through the third hole 123 (or, the first hollow 121*a*) of the first tip 120*a*, the first space D1, and the variable space 129*a* of the second tip 120*b*. In contrast, for example, air may be introduced through the variable space 129*a* of the second tip 120*b* from outside the earphone 100, may be moved along a path from the first space D1 to the first hollow 121*a* of the first tip 120*a*, and may be discharged to the second hole 126 of the second tip 120*b*.

When the user wears the earphone 100, the inner space of the user's ear may be blocked from the outside by the ear tip 120. However, the external air vent (V1) structure may allow the inner space of the ear to be ventilated by air outside the earphone 100. Accordingly, heat and moisture of the body may be discharged outside the earphone 100 through the external air vent V1 without being confined in the inner space of the user's ear, and thus the temperature and humidity in the inner space of the ear may be adjusted to an appropriate level.

Figure 7:
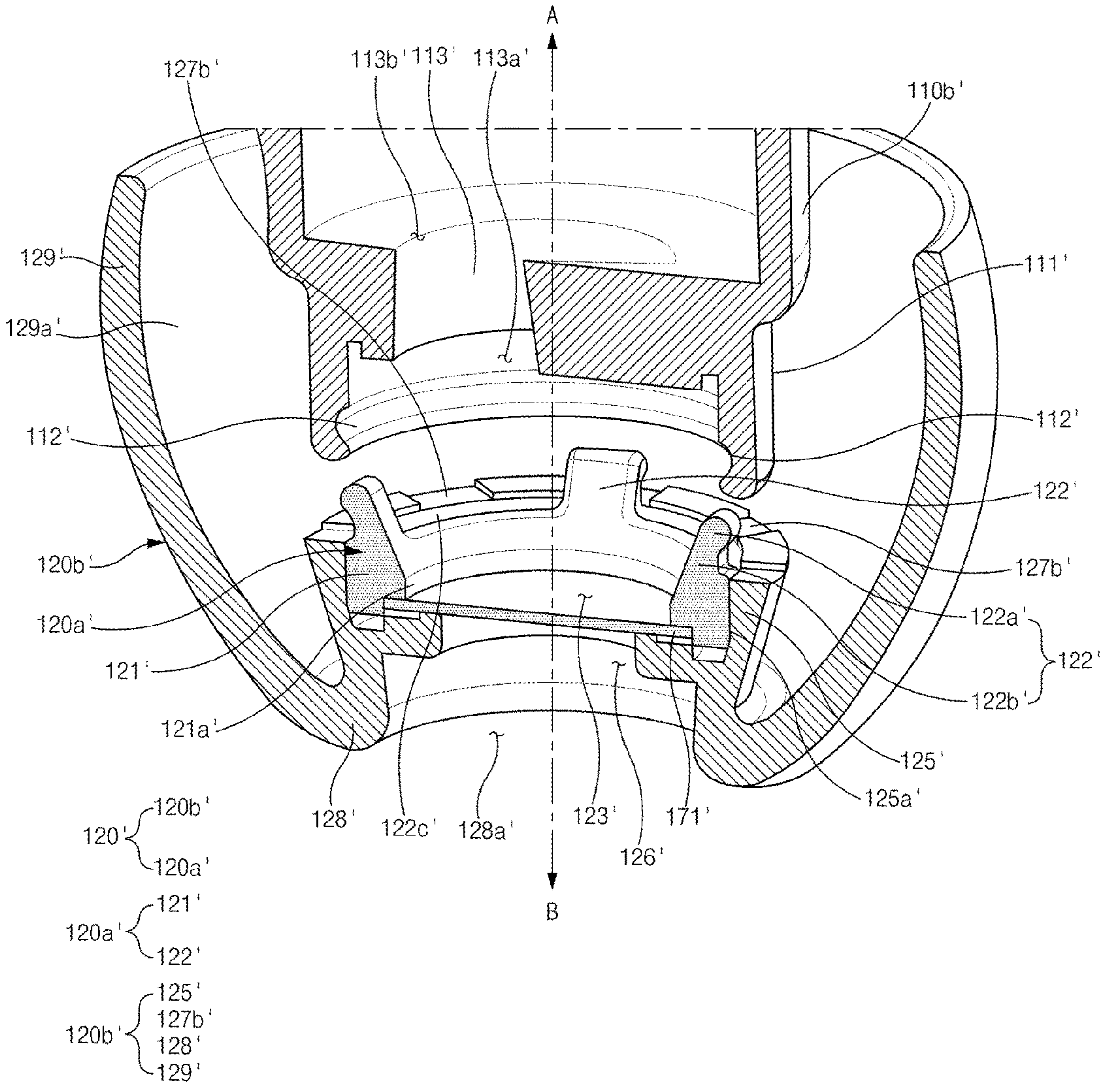
FIG. 7 is a sectional perspective view of a coupling portion of a housing and an ear tip of an example earphone according to various embodiments.
Figure 8:
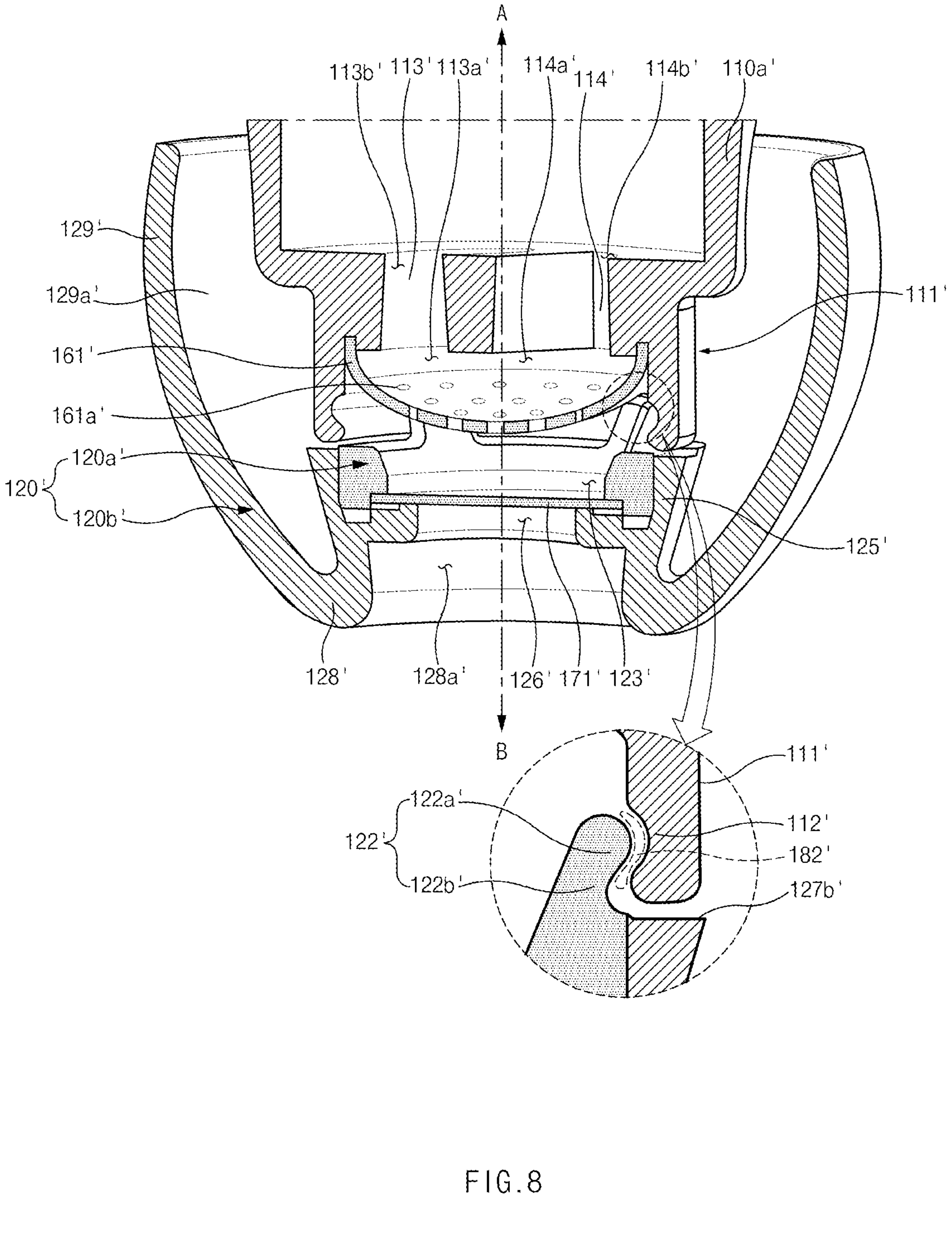
FIG. 8 illustrates a sectional perspective view and a partial enlarged view of the coupling portion of the housing and the ear tip of an example earphone according to various embodiments.
Figure 9:
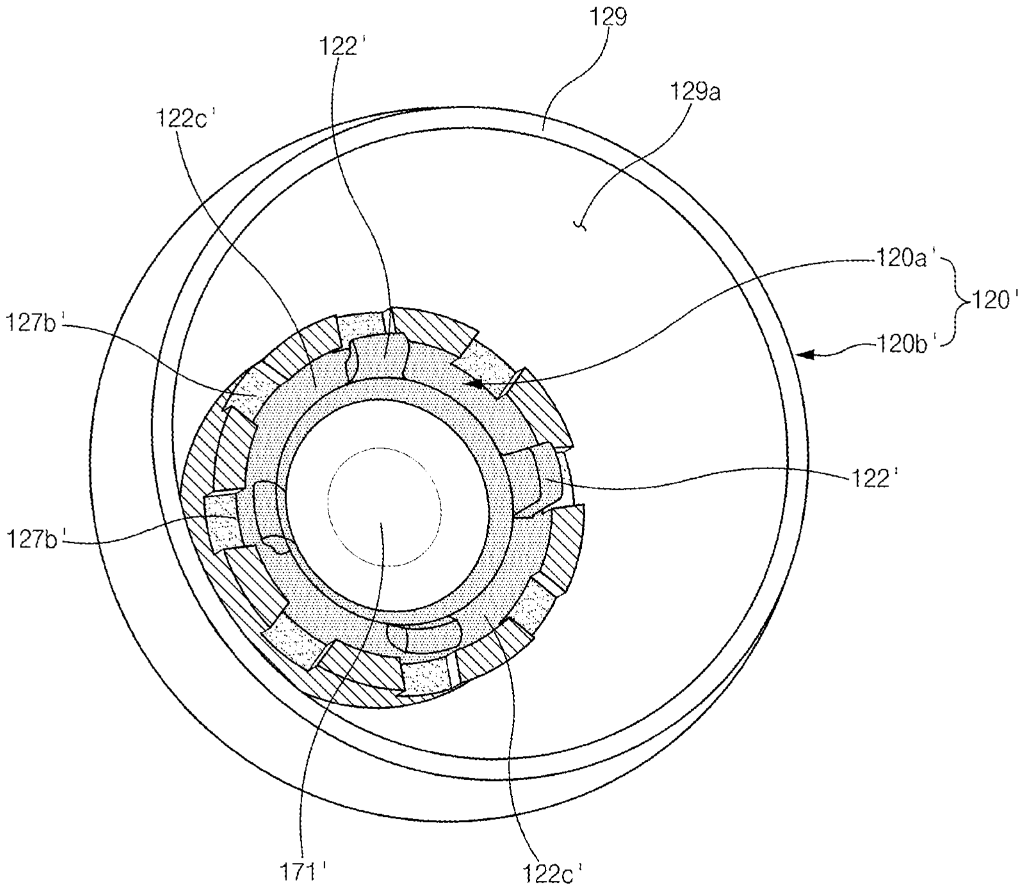
FIG. 9 is a perspective view of the ear tip of an example earphone according to various embodiments.

FIG. 7 is a sectional perspective view of a coupling portion 111' of a housing 110' and an ear tip 120' of an example earphone 100' according to various embodiments. FIG. 8 illustrates a sectional perspective view and a partial enlarged view of the coupling portion 111' of the housing 110' and the ear tip 120' of an example earphone 100' according to various embodiments. FIG. 9 is a perspective view of the ear tip 120' of an example earphone 100' according to various embodiments.

FIG. 7 illustrates a state before the coupling portion 111' and the ear tip 120' are coupled, and FIG. 8 illustrates a state after the coupling portion 111' and the ear tip 120' are coupled.

Referring to FIGS. 7 and 8, the housing 110' (e.g., the housing 110 of FIG. 2) may include a first part 110*a*' (e.g., the first part 110*a* of FIG. 2) having the coupling portion 111' (e.g., the coupling portion 111 of FIG. 2) and a second part 110*b*' (not illustrated) (e.g., the second part 110*b* of FIG. 2) coupled with the first part 110*a*'. The coupling portion 111' may include first and second sound passages 113' and 114' formed therein (e.g., the first and second sound passages 113 and 114 of FIG. 2) and first and second sound holes 113*a*' and 114*a*' (e.g., the first and second sound holes 113*a* and 114*a* of FIG. 2) that the first and second sound passages 113' and 114' extend to an end of the coupling portion 111'. A speaker grill 161' (e.g., the speaker grill 161 of FIG. 2) may be coupled to the coupling portion 111' to cover the first and second sound holes 113*a*' and 114*a*'.

The ear tip 120' (e.g., the ear tip 120 of FIG. 4) may include a first tip 120*a*' (e.g., the first tip 120*a* of FIG. 4) coupled with the coupling portion 111' and a second tip 120*b*' (e.g., the second tip 120*b* of FIG. 4) coupled to the outside of the first tip 120*a*'. The first tip 120*a*' may include a first hollow 121*a*' (e.g., the first hollow 121*a* of FIG. 4) and a first sidewall 121' (e.g., the first sidewall 121 of FIG. 4) surrounding the first hollow 121*a*'. The second tip 120*b*' may include a second hollow 125*a*' (e.g., the second hollow 125*a* of FIG. 4) and a second sidewall 125' (e.g., the second sidewall 125 of FIG. 4) surrounding the second hollow 121*b*'. A foreign matter blocking part 171' (e.g., the foreign matter blocking part 171 of FIG. 4) may be provided between the first tip 120*a*' and the second tip 120*b*'. The first sidewall 121' may include a first connecting portion 122' (e.g., the first connecting portion 122 of FIG. 4) on an end portion thereof in the first direction, and the coupling portion 111' may include a second connecting portion 112' (e.g., the second connecting portion 112 of FIG. 4) to which the first connecting portion 122' is coupled.

The second tip 120*b*' may include a step portion 128' (e.g., the step portion 128 of FIG. 4) protruding in the second direction B from an edge of a second hole 126' (e.g., the second hole 126 of FIG. 4). The second tip 120*b*' may include an external hole 128*a*' (e.g., the external hole 128*a* of FIG. 4) connected with the second hole 126', and the external hole 128*a*' may be surrounded by the step portion 128'. The second tip 120*b*' may include an outside wall portion 129' (e.g., the outside wall portion 129 of FIG. 4) extending from the step portion 128' in the first direction A. The outside wall portion 129' may be spaced apart from an outer surface of the second sidewall 125' of the second tip 120' to form a variable space 129*a*' therebetween (e.g., the variable space 129*a* of FIG. 4). The second tip 120*b*' may include a flexible material, and when inserted into a user's ear canal, the outside wall portion 129' may be elastically deformed in conformance with the shape of the ear canal.

The earphone 100' of FIGS. 7 and 8 may differ from the earphone 100 of the above-described embodiment in terms of the shape of the first connecting portion 122' of the first tip 120*a*', second recesses 127*b*' of the second tip 120*b*', and the shape of the second connecting portion 112' of the coupling portion 111'. Furthermore, the earphone 100' of FIGS. 7 and 8 may differ from the earphone 100 of the above-described embodiment in terms of spaces forming an external air vent (V2) structure.

In an embodiment, the first tip 120*a*' may include the first connecting portion 122' that includes, on an end portion thereof in the first direction, an extending portion 122*b*' and a protrusion 122*a*'. A plurality of first connecting portions 122' may be provided. A concave portion 122*c*' may be formed between the first connecting portions 122' adjacent to each other. The coupling portion 111' may include the second connecting portion 112' having a groove formed thereon in which the protrusions 122*a*' are accommodated. The second tip 120*b*' may have, on an end portion thereof in the first direction, the second recesses 127*b*' extending from an outer edge to an inner edge of the end portion of the second tip 120*b*'. A connection gap 182' may exist between facing surfaces of the first connecting portions 122' and the second connecting portion 112'.

Referring to FIG. 7, in an embodiment, the first connecting portions 122' may include the extending portions 122*b*' extending in the first direction A and the protrusions 122*a*' formed on end portions of the extending portions 122*b*' to protrude outward. In an embodiment, the plurality of first connecting portions 122' may be provided, and the concave portion 122*c*' may be formed between the first connecting portions 122' adjacent to each other.

The coupling portion 111' of the first part 110*a*' to which the first connecting portions 122' are coupled may have an inner diameter greater than the outer diameter of the first connecting portions 122'. In this case, as illustrated in the drawings, the extending portions 122*b*' may extend in the first direction A and the outward direction, and outer surfaces and/or inner surfaces of the extending portions 122*b*' may be formed in a shape inclined in the outward direction.

The second connecting portion 112' of the second tip 120*b*' may have a form in which the groove in which the protrusions 122*a*' of the first connecting portions 122' are accommodated is formed on an inner surface along the perimeter (or, the inner circumference). For example, the second connecting portion 112' may have a groove form that extends along the entire inner circumference of the coupling portion 111' to form a ring, or may have a groove form extending along only a portion of the inner circumference of the coupling portion 111'.

The ear tip 120' may be coupled to the first part 110*a*' of the housing 110' in a snap-fit manner. That is, when the ear tip 120' is mounted on the housing 110' by inserting the first connecting portions 122' of the first tip 120*a*' into an inner space of an end portion of the coupling portion 111', the first connecting portions 122' may move in the first direction A along the curved surface of the second connecting portion 112' in a state of being elastically deformed, and the protrusions 122*a*' of the first connecting portions 122' may be seated in the groove of the second connecting portion 112'.

The first connecting portions 122' may slide along the inner circumference of the coupling portion 111' in a state of being accommodated in the second connecting portion 112'. When the housing 110' is rotated while the earphone 100' is worn in the user's ear, the ear tip 120' may remain inserted into the ear canal without rotating together. According to this configuration, the ear tip 120' may be prevented from being unintentionally rotated (or the unintended rotation of the ear tip 120' may be reduced) to irritate the skin of the ear canal even when the housing 110' is rotated in a process of wearing the earphone 100'.

Facing surfaces of the second connecting portion 112' and the protrusions 122*a*' of the first connecting portions 122' may include curved surfaces. The first connecting portions 122' and the second connecting portion 112' illustrated in the drawings are merely examples, and the shapes of the first connecting portions 122' and the second connecting portion 112' are not limited thereto.

Referring to FIG. 8, as illustrated in the partial enlarged view, end portions of the first tip 120*a*' and the second tip 120*b*' of the ear tip 120' in the first direction may not make direct contact with the coupling portion 111'. The first connecting portions 122' of the first tip 120*a*' and the second connecting portion 112' of the coupling portion 111' may be spaced apart from each other in a coupled state to form the connection gap 182' therebetween. Furthermore, a surface of the second tip 120*b*' in the first direction may include portions in which the second recesses 127*b*' are not formed and thus may be formed so as to be entirely spaced apart from the coupling portion 111'. According to this structure, even when the housing 110' is rotated relative to the ear tip 120', friction due to contact between the second tip 120*b*' and the coupling portion 111' may not be generated or may be reduced or minimized. Accordingly, damage to the ear tip 120' and/or the coupling portion 111' due to friction may be prevented while the ear tip 120' and the housing 110' are connected so as to be rotatable relative to each other.

Referring to FIGS. 7 and 9, in an embodiment, the second tip 120*b*' may have, on the surface thereof in the first direction, the second recesses 127*b*' extending from an outer edge to an inner edge of the surface of the second tip 120*b*'. The second recesses 127*b*' may be concavely formed to be spaced apart from an adjacent surface of the coupling portion 111' in a state in which the first connecting portions 122' and the second connecting portion 112' are coupled.

A plurality of second recesses 127*b*' may be formed. Referring to FIG. 9, the plurality of second recesses 127*b*' may be formed with a predetermined gap therebetween. The second recesses 127*b*' do not necessarily need to be aligned to abut the concave portion 122*c*' of the first tip 120*a*'. However, at least some of the plurality of second recesses 127*b*' may abut the concave portions 122*c*' of the first tip 120*a*'.

For example, the second recesses 127*b*' may form the same plane as the concave portions 122*c*' of the first tip 120*a*' in the lateral direction. As illustrated in FIG. 8, the second recesses 127*b*' connected to abut the concave portions 122*c*' may form a space (e.g., a second space D2 of FIG. 10) open in the outward direction together. In an embodiment, in the lateral direction, the entire surface of the second tip 120*b*' that faces the first direction may form the same plane as surfaces of the concave portions 122*c*' that face the first direction.

Referring to the partial enlarged view of FIG. 8, the connection gap 182' may be formed between the facing surfaces of the protrusions 122*a*' of the first connecting portions 122' and the second connecting portion 112'. Since the connection gap 182' is provided, friction between the first connecting portions 122' and the second connecting portion 112' may be reduced or minimized when the housing 100' rotates relative to the first tip 120*a*'. Hereinafter, the external air vent (V2) structure of the earphone 100' according to this embodiment will be described.

Figure 10:
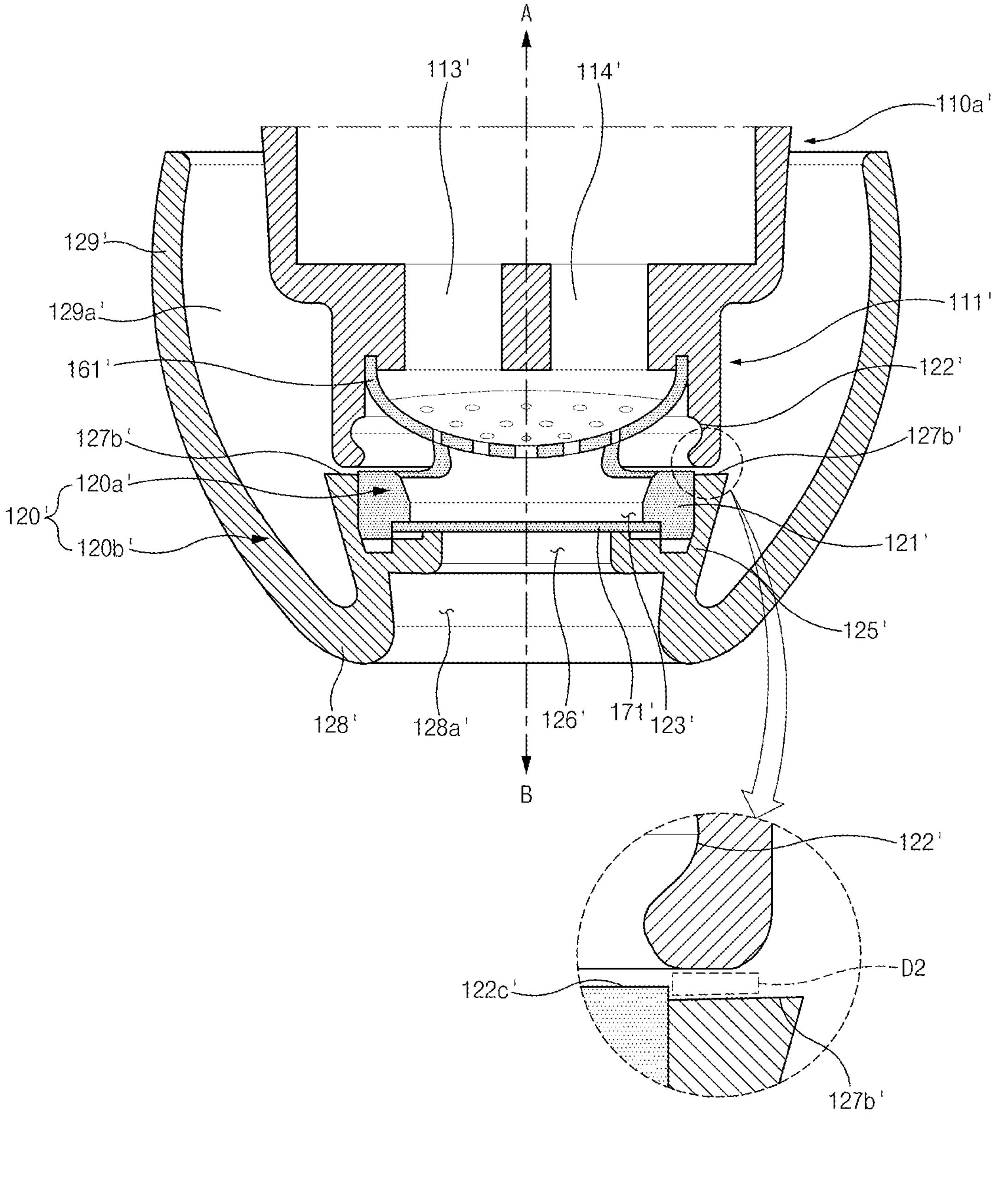
FIG. 10 illustrates a sectional view and a partial enlarged view of the coupling portion of the housing and the ear tip of an example earphone according to various embodiments.
Figure 11:
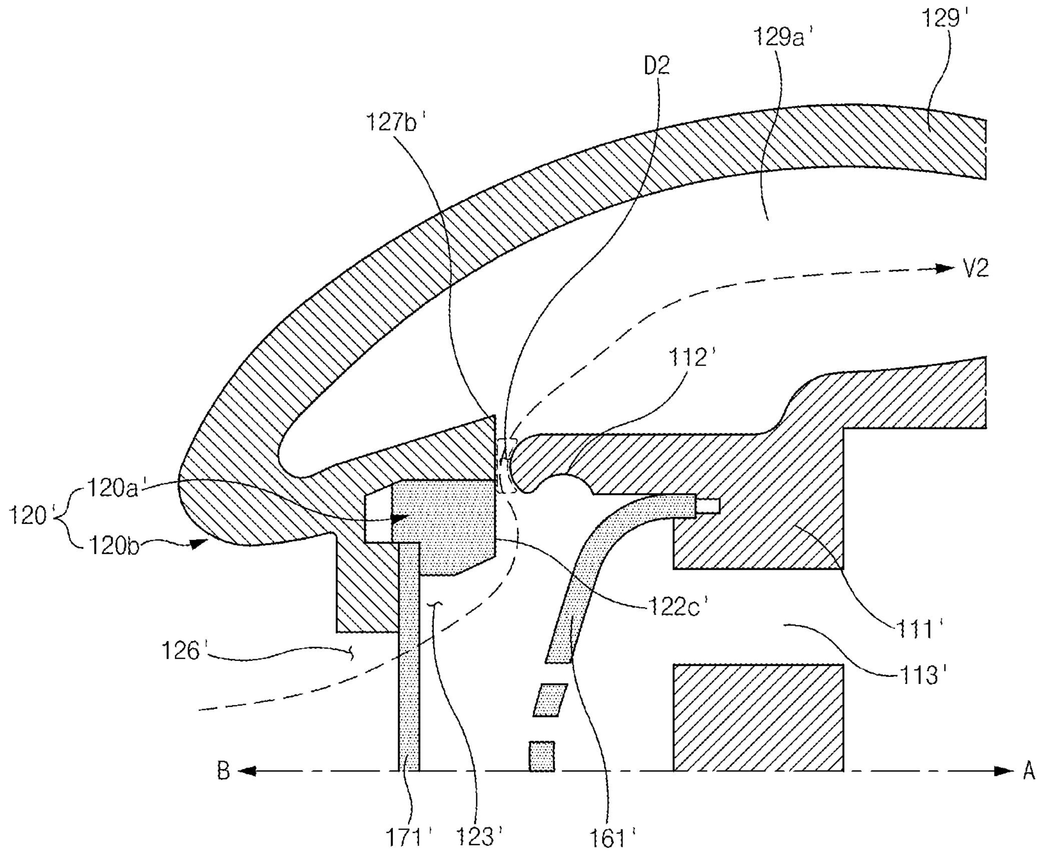
FIG. 11 is a schematic view illustrating an external air vent structure of an example earphone according to various embodiments.

FIG. 10 illustrates a sectional view and a partial enlarged view of the coupling portion 111' and the ear tip 120' of an example earphone 100' according to various embodiments. FIG. 11 is a schematic view illustrating the external air vent (V2) structure of an example earphone 100' according to various embodiments.

FIG. 10 is a sectional view illustrating regions where the concave portions 122*c*' of the first tip 120*a*' and the second recesses 127*b*' of the second tip 120*b*' abut each other. Referring to FIG. 10, the concave portions 122*c*' and the second recesses 127*b*' abutting each other may form the second space D2 together between the coupling portion 111' and the ear tip 120'. Accordingly, the second space D2 between the coupling portion 111' and the ear tip 120' may be connected with the second hole 126' of the second tip **120*b*' through a first hole 123' (or, the first hollow 121*a*') of the first tip 120*a*'** to form a path along which fluid such as air is able to flow.

Referring to FIG. 11, in an embodiment, the external air vent (V2) structure may be formed by a path from the second hole 126' of the second tip **120*b*' to the variable space 129*a*' of the second tip 120*b*' via the first hole 123' (or, the first hollow 121*a*') of the first tip 120*a*' and the second space D2. For example, air may be introduced into the second hole 126' of the second tip 120*b*' and may be discharged outside the earphone 100' through the first hole 123' (or, the first hollow 121*a*') of the first tip 120*a*', the second space D2, and the variable space 129*a*' of the second tip 120*b*'. In contrast, for example, air may be introduced into the variable space 129*a*' of the second tip 120*b*' from outside the earphone 100' and may be discharged to the second hole 126' of the second tip 120*b*' through the second space D2 and the first hole 123' (or, the first hollow 121*a*') of the first tip 120*a*'**.

Referring to FIG. 8, fluid such as air may also pass through the connection gap 182' formed between the facing surfaces of the first connecting portions 122' and the second connecting portion 112'. The connection gap 182' may be in communication with the second space D2. For example, the external air vent (V2) structure may be formed by a path from the second hole 126' of the second tip **120*b*' to the variable space 129*a*' of the second tip 120*b*' via the first hollow 121*a*' of the first tip 120*a*' and the connection gap 182'**.

When the user wears the earphone 100' by inserting the ear tip 120' into the ear canal, the inner space of the user's ear blocked from the outside by the ear tip 120' may be ventilated by air outside the earphone 100' through the external air vent (V2) structure. Accordingly, heat and moisture emitted from the user's body may be discharged outside the earphone 100' through the external air vent (V2) structure without being confined in the inner space of the user's ear.

Figure 12:
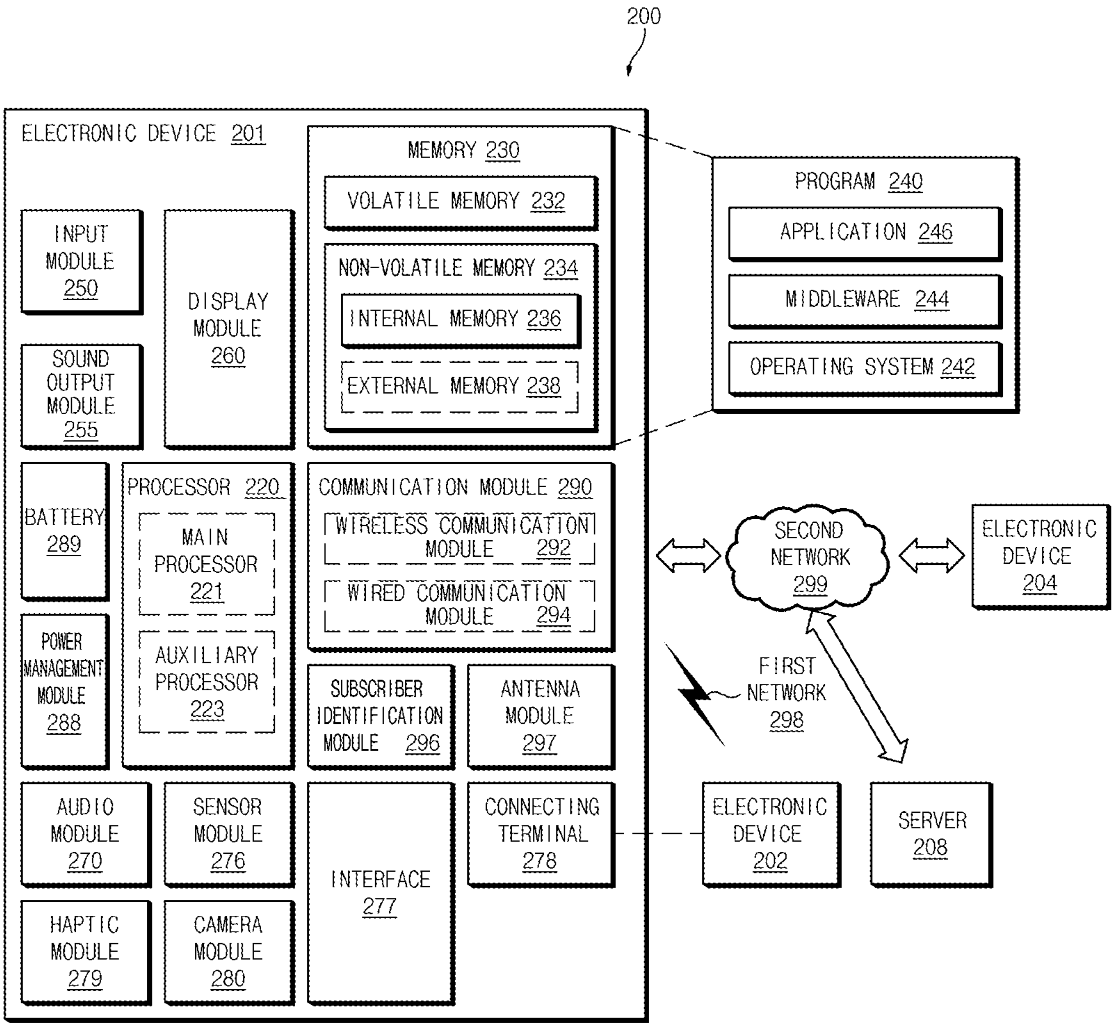
FIG. 12 is a block diagram illustrating an example electronic device in a network environment according to various embodiments.

FIG. 12 is a block diagram illustrating an example electronic device 201 in a network environment according to various embodiments.

For example, an external electronic device 202 may be the same device as the ear phones 100 and 100'.

Referring to FIG. 12, the electronic device 201 in the network environment 200 may communicate with an electronic device 202 via a first network 298 (e.g., a short-range wireless communication network), or at least one of an electronic device 204 or a server 208 via a second network 299 (e.g., a long-range wireless communication network). According to an embodiment, the electronic device 201 may communicate with the electronic device 204 via the server 208. According to an embodiment, the electronic device 201 may include a processor 220, memory 230, an input module 250, a sound output module 255, a display module 260, an audio module 270, a sensor module 276, an interface 277, a connecting terminal 278, a haptic module 279, a camera module 280, a power management module 288, a battery 289, a communication module 290, a subscriber identification module (SIM) 296, or an antenna module 297. In various embodiments, at least one of the components (e.g., the connecting terminal 278) may be omitted from the electronic device 201, or one or more other components may be added in the electronic device 201. In various embodiments, some of the components (e.g., the sensor module 276, the camera module 280, or the antenna module 297) may be implemented as a single component (e.g., the display module 260).

The processor 220 may execute, for example, software (e.g., a program 240) to control at least one other component (e.g., a hardware or software component) of the electronic device 201 coupled with the processor 220, and may perform various data processing or computation. According to an embodiment, as at least part of the data processing or computation, the processor 220 may store a command or data received from another component (e.g., the sensor module 276 or the communication module 290) in volatile memory 232, process the command or the data stored in the volatile memory 232, and store resulting data in non-volatile memory 234. According to an embodiment, the processor 220 may include a main processor 221 (e.g., a central processing unit (CPU) or an application processor (AP)), or an auxiliary processor 223 (e.g., a graphics processing unit (GPU), a neural processing unit (NPU), an image signal processor (ISP), a sensor hub processor, or a communication processor (CP)) that is operable independently from, or in conjunction with, the main processor 221. For example, when the electronic device 201 includes the main processor 221 and the auxiliary processor 223, the auxiliary processor 223 may be adapted to consume less power than the main processor 221, or to be specific to a specified function. The auxiliary processor 223 may be implemented as separate from, or as part of the main processor 221.

The auxiliary processor 223 may control at least some of functions or states related to at least one component (e.g., the display module 260, the sensor module 276, or the communication module 290) among the components of the electronic device 201, instead of the main processor 221 while the main processor 221 is in an inactive (e.g., sleep) state, or together with the main processor 221 while the main processor 221 is in an active state (e.g., executing an application). According to an embodiment, the auxiliary processor 223 (e.g., an image signal processor or a communication processor) may be implemented as part of another component (e.g., the camera module 280 or the communication module 290) functionally related to the auxiliary processor 223. According to an embodiment, the auxiliary processor 223 (e.g., the neural processing unit) may include a hardware structure specified for artificial intelligence model processing. An artificial intelligence model may be generated by machine learning. Such learning may be performed, e.g., by the electronic device 201 where the artificial intelligence is performed or via a separate server (e.g., the server 208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 230 may store various data used by at least one component (e.g., the processor 220 or the sensor module 276) of the electronic device 201. The various data may include, for example, software (e.g., the program 240) and input data or output data for a command related thereto. The memory 230 may include the volatile memory 232 or the non-volatile memory 234.

The program 240 may be stored in the memory 230 as software, and may include, for example, an operating system (OS) 242, middleware 244, or an application 246.

The input module 250 may receive a command or data to be used by another component (e.g., the processor 220) of the electronic device 201, from the outside (e.g., a user) of the electronic device 201. The input module 250 may include, for example, a microphone, a mouse, a keyboard, a key (e.g., a button), or a digital pen (e.g., a stylus pen).

The sound output module 255 may output sound signals to the outside of the electronic device 201. The sound output module 255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 260 may visually provide information to the outside (e.g., a user) of the electronic device 201. The display module 260 may include, for example, a display, a hologram device, or a projector and control circuitry to control a corresponding one of the display, hologram device, and projector. According to an embodiment, the display module 260 may include a touch sensor adapted to detect a touch, or a pressure sensor adapted to measure the intensity of force incurred by the touch.

The audio module 270 may convert a sound into an electrical signal and vice versa. According to an embodiment, the audio module 270 may obtain the sound via the input module 250, or output the sound via the sound output module 255 or a headphone of an external electronic device (e.g., an electronic device 202) directly (e.g., wiredly) or wirelessly coupled with the electronic device 201.

The sensor module 276 may detect an operational state (e.g., power or temperature) of the electronic device 201 or an environmental state (e.g., a state of a user) external to the electronic device 201, and then generate an electrical signal or data value corresponding to the detected state. According to an embodiment, the sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the electronic device 202) directly (e.g., wiredly) or wirelessly. According to an embodiment, the interface 277 may include, for example, a high definition multimedia interface (HDMI), a universal serial bus (USB) interface, a secure digital (SD) card interface, or an audio interface.

A connecting terminal 278 may include a connector via which the electronic device 201 may be physically connected with the external electronic device (e.g., the electronic device 202). According to an embodiment, the connecting terminal 278 may include, for example, a HDMI connector, a USB connector, a SD card connector, or an audio connector (e.g., a headphone connector).

The haptic module 279 may convert an electrical signal into a mechanical stimulus (e.g., a vibration or a movement) or electrical stimulus which may be recognized by a user via his tactile sensation or kinesthetic sensation. According to an embodiment, the haptic module 279 may include, for example, a motor, a piezoelectric element, or an electric stimulator.

The camera module 280 may capture a still image or moving images. According to an embodiment, the camera module 280 may include one or more lenses, image sensors, image signal processors, or flashes.

The power management module 288 may manage power supplied to the electronic device 201. According to an embodiment, the power management module 288 may be implemented as at least part of, for example, a power management integrated circuit (PMIC).

The battery 289 may supply power to at least one component of the electronic device 201. According to an embodiment, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the electronic device 202, the electronic device 204, or the server 208) and performing communication via the established communication channel. The communication module 290 may include one or more communication processors that are operable independently from the processor 220 (e.g., the application processor (AP)) and supports a direct (e.g., wired) communication or a wireless communication. According to an embodiment, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device via the first network 298 (e.g., a short-range communication network, such as Bluetooth™, wireless-fidelity (Wi-Fi) direct, or infrared data association (IrDA)) or the second network 299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 292 may identify and authenticate the electronic device 201 in a communication network, such as the first network 298 or the second network 299, using subscriber information (e.g., international mobile subscriber identity (IMSI)) stored in the subscriber identification module 296.

The wireless communication module 292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 292 may support a high-frequency band (e.g., the mmWave band) to achieve, e.g., a high data transmission rate. The wireless communication module 292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 292 may support various requirements specified in the electronic device 201, an external electronic device (e.g., the electronic device 204), or a network system (e.g., the second network 299). According to an embodiment, the wireless communication module 292 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 297 may transmit or receive a signal or power to or from the outside (e.g., the external electronic device) of the electronic device 201. According to an embodiment, the antenna module 297 may include an antenna including a radiating element composed of or including a conductive material or a conductive pattern formed in or on a substrate (e.g., a printed circuit board (PCB)). According to an embodiment, the antenna module 297 may include a plurality of antennas (e.g., array antennas). In such a case, at least one antenna appropriate for a communication scheme used in the communication network, such as the first network 298 or the second network 299, may be selected, for example, by the communication module 290 (e.g., the wireless communication module 292) from the plurality of antennas. The signal or the power may then be transmitted or received between the communication module 290 and the external electronic device via the selected at least one antenna. According to an embodiment, another component (e.g., a radio frequency integrated circuit (RFIC)) other than the radiating element may be additionally formed as part of the antenna module 297.

According to various embodiments, the antenna module 297 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 201 and the external electronic device 204 via the server 208 coupled with the second network 299. Each of the electronic devices 202 or 204 may be a device of a same type as, or a different type, from the electronic device 201. According to an embodiment, all or some of operations to be executed at the electronic device 201 may be executed at one or more of the external electronic devices 202, 204, or 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, mobile edge computing (MEC), or client-server computing technology may be used, for example. The electronic device 201 may provide ultra low-latency services using, e.g., distributed computing or mobile edge computing. In an embodiment, the external electronic device 204 may include an internet-of-things (IoT) device. The server 208 may be an intelligent server using machine learning and/or a neural network. According to an embodiment, the external electronic device 204 or the server 208 may be included in the second network 299. The electronic device 201 may be applied to intelligent services (e.g., smart home, smart city, smart car, or healthcare) based on 5G communication technology or IoT-related technology.

An earphone 100 according to various example embodiments of the disclosure may include a housing 110 having a speaker module 140 embedded therein and an ear tip 120 connected to the housing 110. The housing 110 may include a coupling portion 111 having a sound hole **113*a* and 114*a* formed in an end portion thereof. The ear tip 120 may include a first tip 120*a* including a first hollow 121*a* aligned with the sound hole 113*a* and 114*a* in a first direction A and a first sidewall 121 that surrounds the first hollow 121*a* and a second tip 120*b* including a second hollow 125*a* in which the first tip 120*a* is accommodated and a second sidewall 125 that surrounds the second hollow 125*a*, the first direction A being a direction toward the speaker module 140 from the sound hole 113*a* and 114*a*. The first tip 120*a* may include a first connecting portion 122 having a protrusion form on an end portion thereof in the first direction A. The coupling portion 111 may include, on one surface thereof, a second connecting portion 112 having a groove form with which the first connecting portion 122 is engaged. A connection gap 182 may be formed between facing surfaces of the first connecting portion 122 and the second connecting portion 112, and the coupling portion 111 of the housing 110 and the ear tip 120** may be connected so as to be rotatable relative to each other.

In various example embodiments, at least a partial region of the coupling portion 111 may be inserted into the first hollow **121*a*. A groove 116 concavely formed in the first direction A may be provided on at least one of the first sidewall 121 or a facing surface of the coupling portion 111. The groove 116 may form a first gap 181 between the first sidewall 121 and the facing surface of the coupling portion 111. The first gap 181 may be connected with the connection gap 182 in the first direction A and may be connected with the first hollow 121*a* in a second direction B opposite to the first direction A. The connection gap 182 may extend in the first direction A between the housing 110 and the ear tip 120 and may be open to the outside of the earphone 100. The first hollow 121*a*, the first gap 181, and the connection gap 182** may be fluidically connected with each other.

In various example embodiments, the first connecting portion 122 may have a form in which a partial region of the end portion of the first tip **120*a* in the first direction A protrudes in an inward direction. The second connecting portion 112 may have a groove form formed on an outer surface of the coupling portion 111 along a circumference of the coupling portion 111, the outer surface of the coupling portion 111 being spaced apart from the end portion of the coupling portion 111 in the first direction A. A region from the end portion of the coupling portion 111 to the second connecting portion 112 may be inserted into the first hollow 121***a*.

In various example embodiments, a second gap 183 may be formed between end portions of the first sidewall 121 and the second sidewall 125 in the first direction A and the facing surface of the coupling portion 111, and the connection gap 182 may be connected with the outside of the earphone 100 through the second gap 183.

In various example embodiments, the first connecting portion 122 may have a form in which a partial region of the end portion of the first tip 120*a* in the first direction A protrudes in an inward direction. The second connecting portion 112 may have a groove form formed on an outer surface of the coupling portion 111 along a circumference of the coupling portion 111, the outer surface of the coupling portion 111 being spaced apart from the end portion of the coupling portion 111 in the first direction A. A region from the end portion of the coupling portion 111 to the second connecting portion 112 may be inserted into the first hollow 121*a*.

In various example embodiments, a groove 116 that extends from the end portion of the coupling portion 111 to the second connecting portion 112 in the first direction A may be concavely formed on the outer surface of the coupling portion 111. The groove 116 may form a first gap 181 connected with the connection gap 182 in the first direction A and connected with the first hollow 121*a* in a second direction B opposite to the first direction A. The connection gap 182 may extend in the first direction A between the housing 110 and the ear tip 120 and may be open to the outside of the earphone 100, and the first hollow 121*a*, the connection gap 182, and the first gap 181 may be fluidically connected with each other.

In various example embodiments, an end portion of the second tip 120*b* in the first direction A may include a cover portion 127*a* formed in the inward direction to cover the end portion of the first tip 120*a* in the first direction A. The cover portion 127*a* may include a plurality of cover portions, and a first recess 127*b* that connects the end portion of the first tip 120*a* in the first direction and the outside of the ear tip 120 may be formed between the cover portions 127*a* adjacent to each other.

In various example embodiments, a groove 116 that extends from the end portion of the coupling portion 111 to the second connecting portion 112 may be concavely formed on the outer surface of the coupling portion 111 in the first direction A. The groove 116 may form a first gap 181 connected with the connection gap 182 in the first direction A and connected with the first hollow 121*a* in a second direction B opposite to the first direction A. A second gap 183 may be formed between the first recess 127*b* and a facing surface of the coupling portion 111. The second gap 183 may extend in a lateral direction perpendicular to the first direction A and may be open to the outside of the earphone 100. The first hollow 121*a*, the first gap 181, the connection gap 182, and the second gap 183 may be fluidically connected with each other.

In various example embodiments, the first connecting portion 122' may include an extending portion 122*b*' that extends in the first direction A and a protrusion 122*a*' formed on an end portion of the extending portion 122*b*' in an outward direction. The second connecting portion 112' may have a groove form formed on an inner surface of the coupling portion 111' along a circumference of the coupling portion 111'. The first connecting portion 122' may be able to slide in a circumferential direction of the coupling portion 111' in a state in which the protrusion 122*a*' is inserted into the second connecting portion 112'.

In various example embodiments, the first connecting portion 122' may include a plurality of first connecting portions, and a concave portion 122*c*' may be formed between the first connecting portions 122' adjacent to each other. A second space D2 may be formed between the concave portion 122*c*' and a facing surface of the coupling portion 111'. The second space D2 may extend in a lateral direction perpendicular to the first direction A and may be open to the outside of the earphone 100'. The first hollow 121*a*' may be fluidically connected with the second space D2.

In various example embodiments, the second tip 120*b*' may have, on an end portion thereof in the first direction A, a second recess 127*b*' that connects an inner edge and an outer edge of the end portion of the second tip 120*b*', and at least one of the concave portions 122*c*' may abut the second recess 127*b*' and may form the second space D2 together.

In various example embodiments, the first connecting portion 122 may be formed of a material capable of elastic deformation and may be fastened to the second connecting portion 112 in a snap-fit manner.

In various example embodiments, the first tip 120*a* may be formed of a material having a higher hardness than the second tip 120*b* and capable of elastic deformation.

An earphone 100 according to various example embodiments of the disclosure may include a housing 110 including a coupling portion 111 having a sound hole 113*a* and 114*a* formed in an end portion thereof and an ear tip 120 connected to the coupling portion 111 so as to be rotatable. The ear tip 120 may include a hollow 121*a* and 125*a* fluidically connected with the sound hole 113*a* and 114*a* in a first direction A, a sidewall 121 and 125 that surrounds the hollow, and a first connecting portion 122 that has a protrusion form and that is formed on an end portion of the sidewall 121 and 125 in the first direction A, the first direction A being a direction in which the coupling portion 111 extends. The coupling portion 111 may include, on one surface thereof, a second connecting portion 112 having a groove form with which the first connecting portion 111 is engaged. A connection gap 182 may be formed between facing surfaces of the first connecting portion 122 and the second connecting portion 112 coupled with each other, and the first connecting portion 122 may be able to slide along the second connecting portion 112.

In various example embodiments, at least a partial region of the coupling portion 111 may be inserted into the hollow 121*a* and 125*a*. A groove 116 may be formed on at least one of the sidewall 121 and 125 or a facing surface of the coupling portion 111. The groove 116 may form a first gap 181 between the sidewall 121 and 125 and the facing surface of the coupling portion 111, the first gap 181 being connected with the connection gap 182 in the first direction A and connected with the hollow 121*a* and 125*a* in a second direction B opposite to the first direction A. The connection gap 182 may extend in the first direction A between the housing 110 and the ear tip 120 and may be open to the outside of the earphone 100. The hollow 121*a* and 125*a*, the first gap 181, and the connection gap 182 may be fluidically connected with each other to form a first space D1.

In various example embodiments, the first connecting portion 122 may have a form in which a partial region of the end portion of the sidewall in the first direction A protrudes in an inward direction. The second connecting portion 112 may have a groove form formed on an outer surface of the coupling portion 111 along a circumference of the coupling portion 111, the outer surface of the coupling portion 111 being spaced apart from the end portion of the coupling portion 111 in the first direction A. A region from the end portion of the coupling portion 111 to the second connecting portion 112 may be inserted into the hollow 121*a* and 125*a*.

In various example embodiments, a groove 116 that extends from the end portion of the coupling portion 111 to the second connecting portion 112 in the first direction A may be concavely formed on the outer surface of the coupling portion 111. The groove 116 may form a first gap 181 connected with the connection gap 182 in the first direction A and connected with the hollow 121*a* and 125*a* in a second direction B opposite to the first direction A. The connection gap 182 may be connected with the outside of the earphone 100, and the hollow 121*a* and 125*a*, the connection gap 182, and the first gap 181 may be fluidically connected with each other.

In various example embodiments, the first connecting portion 122' may include an extending portion 122*b*' that extends in the first direction A and a protrusion 122*a*' formed on an end portion of the extending portion 122*b*' in an outward direction. The second connecting portion 112' may have a groove form formed on an inner surface of the coupling portion 111' along a circumference of the coupling portion 111'. The first connecting portion 122' may be able to slide in a circumferential direction of the coupling portion 111' in a state in which the protrusion 122*a*' is inserted into the second connecting portion 112'.

In various example embodiments, the first connecting portion 122' may include a plurality of first connecting portions, and a concave portion 122*c*' may be formed between the first connecting portions 122' adjacent to each other. A second space D2 may be formed between the concave portion 122*c*' and a facing surface of the coupling portion 111'. The second space D2 may extend in a lateral direction perpendicular to the first direction A and may be open to the outside of the earphone 100'. The hollow 121*a*' and 125*a*' may be fluidically connected with the second space D2.

In various example embodiments, the ear tip 120' may have, on an end portion thereof in the first direction A, a second recess 127*b*' that connects an inner edge and an outer edge of the end portion of the ear tip 120', and at least one of the concave portions 122*c*' may abut the second recess 127*b*' and may form the second space D2 together.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as “A or B,” “at least one of A and B,” “at least one of A or B,” “A, B, or C,” “at least one of A, B, and C,” and “at least one of A, B, or C,” may include any one of, or all possible combinations of the items enumerated together in a corresponding one of the phrases. As used herein, such terms as “1st” and “2nd,” or “first” and “second” may be used to simply distinguish a corresponding component from another, and does not limit the components in other aspect (e.g., importance or order). It is to be understood that if an element (e.g., a first element) is referred to, with or without the term “operatively” or “communicatively”, as “coupled with,” “coupled to,” “connected with,” or “connected to” another element (e.g., a second element), it means that the element may be coupled with the other element directly (e.g., wiredly), wirelessly, or via a third element.

As used in connection with various embodiments of the disclosure, the term “module” may include a unit implemented in hardware, software, or firmware, or any combination thereof, and may interchangeably be used with other terms, for example, “logic,” “logic block,” “part,” or “circuitry”. A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 240) including one or more instructions that are stored in a storage medium (e.g., internal memory 236 or external memory 238) that is readable by a machine (e.g., the electronic device 201). For example, a processor (e.g., the processor 220) of the machine (e.g., the electronic device 201) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium, where the term “non-transitory” may, for example, refer to a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer’s server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by one skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An earphone comprising:

a housing including a speaker module embedded therein; and an ear tip rotatably connected to the housing, wherein the housing includes a coupling portion having a sound hole, wherein the ear tip includes a first tip connected to an outer portion of the coupling portion in which the sound hole is formed, wherein the first tip includes a first connecting portion including a protrusion, and wherein the coupling portion includes a second connecting portion including a groove configured to engage the protrusion of the first connecting portion such that the first tip is rotatable with respect to the coupling portion, wherein a connection gap is formed between the first connecting portion and the second connecting portion, and wherein at least a portion of an external air of the earphone flows into the ear tip along the outer portion of the coupling portion through the connection gap without entering the sound hole.

2. The earphone of claim 1, wherein the ear tip further includes a second tip in which the first tip is accommodated, wherein the first tip further includes a first hollow aligned with the sound hole in a first direction and a first sidewall configured to surround the first hollow, wherein the second tip includes a second hollow in which the first tip is accommodated and a second sidewall configured to surround the second hollow, and wherein the first direction being a direction toward the speaker module from the sound hole.

3. The earphone of claim 2, wherein at least a partial region of the coupling portion is inserted into the first hollow, wherein a groove concavely formed in the first direction is provided on at least one of the first sidewall or a facing surface of the coupling portion, wherein the groove forms a first gap between the first sidewall and the facing surface of the coupling portion, wherein the first gap is connected with the connection gap in the first direction and connected with the first hollow in a second direction opposite to the first direction, wherein the connection gap extends in the first direction between the housing and the ear tip and is open to the outside of the earphone, and wherein the first hollow, the first gap, and the connection gap are fluidically connected with each other.

4. The earphone of claim 3, wherein the first connecting portion is configured so that a partial region of an end portion of the first tip in the first direction protrudes in an inward direction, wherein the second connecting portion has a groove formed on an outer surface of the coupling portion along a circumference of the coupling portion, the outer surface of the coupling portion being spaced apart from the end portion of the coupling portion in the first direction, and wherein a region from the end portion of the coupling portion to the second connecting portion is inserted into the first hollow.

5. The earphone of claim 4, wherein a second gap is formed between end portions of the first sidewall and the second sidewall in the first direction and the facing surface of the coupling portion, and wherein the connection gap is connected with the outside of the earphone through the second gap.

6. The earphone of claim 2, wherein the first connecting portion is configured so that a partial region of an end portion of the first tip in the first direction protrudes in an inward direction, wherein the second connecting portion has a groove formed on an outer surface of the coupling portion along a circumference of the coupling portion, the outer surface of the coupling portion being spaced apart from the end portion of the coupling portion in the first direction, and wherein a region from the end portion of the coupling portion to the second connecting portion is inserted into the first hollow.

7. The earphone of claim 6, wherein a groove configured to extend from the end portion of the coupling portion to the second connecting portion in the first direction is concavely formed on the outer surface of the coupling portion, wherein the groove forms a first gap connected with the connection gap in the first direction and connected with the first hollow in a second direction opposite to the first direction, wherein the connection gap extends in the first direction between the housing and the ear tip and is open to the outside of the earphone, and wherein the first hollow, the connection gap, and the first gap are fluidically connected with each other.

8. The earphone of claim 6, wherein an end portion of the second tip in the first direction includes a cover portion formed in the inward direction to cover the end portion of the first tip in the first direction, and wherein the cover portion includes a plurality of cover portions, and a first recess configured to connect the end portion of the first tip in the first direction and the outside of the ear tip is formed between the cover portions adjacent to each other.

9. The earphone of claim 8, wherein a groove configured to extend from the end portion of the coupling portion to the second connecting portion is concavely formed on the outer surface of the coupling portion in the first direction, wherein the groove forms a first gap connected with the connection gap in the first direction and connected with the first hollow in a second direction opposite to the first direction, wherein a second gap is formed between the first recess and a facing surface of the coupling portion, wherein the second gap extends in a lateral direction perpendicular to the first direction and is open to the outside of the earphone, and wherein the first hollow, the first gap, the connection gap, and the second gap are fluidically connected with each other.

10. The earphone of claim 2, wherein the first connecting portion includes an extending portion configured to extend in the first direction and the protrusion formed on an end portion of the extending portion in an outward direction, wherein the second connecting portion includes the groove formed on an inner surface of the coupling portion along a circumference of the coupling portion, and wherein the first connecting portion is configured to slide in a circumferential direction of the coupling portion in a state in which the protrusion is inserted into the groove of the second connecting portion.

11. The earphone of claim 10, wherein the first connecting portion includes a plurality of first connecting portions, and a concave portion is formed between the first connecting portions adjacent to each other, wherein a second space is formed between the concave portion and a facing surface of the coupling portion, wherein the second space extends in a lateral direction perpendicular to the first direction and is open to the outside of the earphone, and wherein the first hollow is fluidically connected with the second space.

12. The earphone of claim 11, wherein the second tip includes, on an end portion thereof in the first direction, a second recess configured to connect an inner edge and an outer edge of the end portion of the second tip, and wherein at least one of the concave portions abuts the second recess and forms the second space together.

13. The earphone of claim 2, wherein the first tip comprises a material having a higher hardness than the second tip and capable of elastic deformation.

* * * * *